(12) United States Patent
Lee et al.

(10) Patent No.: US 9,174,142 B2
(45) Date of Patent: Nov. 3, 2015

(54) FASTENING STRUCTURE

(75) Inventors: Hyung-Gon Lee, Seoul (KR); Tae-Won Lee, Pocheon (KR); Kwang-Sik Park, Seoul (KR)

(73) Assignee: Hyung-Gon Lee, Seoul (KR)

( * ) Notice: Subject to any disclaimer, the term of this patent is extended or adjusted under 35 U.S.C. 154(b) by 338 days.

(21) Appl. No.: 13/635,434

(22) PCT Filed: Mar. 18, 2011

(86) PCT No.: PCT/KR2011/001881
§ 371 (c)(1),
(2), (4) Date: Sep. 16, 2012

(87) PCT Pub. No.: WO2011/115446
PCT Pub. Date: Sep. 22, 2011

(65) Prior Publication Data
US 2013/0000089 A1    Jan. 3, 2013

(30) Foreign Application Priority Data

Mar. 19, 2010  (KR) .................. 10-2010-0024629
Jun. 22, 2010  (KR) .................. 10-2010-0058946
Dec. 24, 2010  (KR) .................. 10-2010-0134882

(51) Int. Cl.
*A44B 18/00*       (2006.01)
*A63H 33/06*       (2006.01)
(Continued)

(52) U.S. Cl.
CPC .......... *A63H 33/062* (2013.01); *A44B 18/0053* (2013.01); *G09B 1/30* (2013.01);
(Continued)

(58) Field of Classification Search
CPC .... A44B 18/0053; A63H 33/062; G09B 1/30; F16B 5/07; Y10T 24/2532; Y10T 24/2534; Y10T 24/2573; Y10T 24/45241

USPC ............................................. 24/399, 400, 442
See application file for complete search history.

(56) References Cited

U.S. PATENT DOCUMENTS 3,808,648 A * 5/1974 Billarant et al. ................ 24/450
5,088,162 A * 2/1992 Allan ............................. 24/442
(Continued)

FOREIGN PATENT DOCUMENTS

JP           06-154016 A    6/1994
KR    20-1994-0004117 A    2/1994
(Continued)

OTHER PUBLICATIONS

International Search Report of PCT/KR2011/001881 dated Nov. 29, 2011.
(Continued)

*Primary Examiner* — Robert J Sandy
*Assistant Examiner* — Louis Mercado

(57) ABSTRACT

Disclosed herein is a fastening structure which enables objects to be easily coupled to or removed from each other, and which enables the relative positions between the objects to be changed in the longitudinal position of zipper rails. The fastening structure includes a first zipper rail unit which is provided on a planar portion of a first object and has zipper rails arranged parallel to each other, and a second zipper rail unit which is provided on a planar portion of a second object and has zipper rails arranged parallel to each other. While the zipper rails of the first zipper rail unit are individually coupled to the corresponding zipper rails of the second zipper rail unit in a female-male engagement manner, relative positions between the first object and the second object can be changed in the longitudinal direction of the zipper rails.

16 Claims, 50 Drawing Sheets

(51) Int. Cl.
  *G09B 1/30* (2006.01)
  *F16B 5/07* (2006.01)
(52) U.S. Cl.
  CPC ............... *F16B 5/07* (2013.01); *Y10T 24/2532* (2015.01); *Y10T 24/2534* (2015.01); *Y10T 24/2573* (2015.01); *Y10T 24/45241* (2015.01)

(56) References Cited

U.S. PATENT DOCUMENTS

| 5,185,909 | A | | 2/1993 | Inagaki | |
|---|---|---|---|---|---|
| 7,140,774 | B2 | * | 11/2006 | Galkiewicz et al. | 384/9 |
| 2003/0190451 | A1 | * | 10/2003 | Baker et al. | 428/99 |
| 2004/0170342 | A1 | * | 9/2004 | Galkiewicz | 384/42 |
| 2005/0136214 | A1 | * | 6/2005 | Most | 428/100 |

FOREIGN PATENT DOCUMENTS

| KR | 10-2000-0062478 A | 10/2000 |
|---|---|---|
| KR | 10-2001-0081978 | 8/2001 |
| KR | 20-0344534 B | 3/2004 |
| KR | 10-2006-0135895 A | 12/2006 |
| KR | 20-0449674 B | 7/2010 |

OTHER PUBLICATIONS

Office Action issued by the Korean Intellectual Office mailed Sep. 27, 2010.

* cited by examiner (a)

(b)

FASTENING STRUCTURE

TECHNICAL FIELD

The present invention relates, in general, to fastening structures and, more particularly, to a fastening structure which enables a plurality of objects to be easily coupled to or removed from each other, and which enables the relative positions between the objects to be changed in the longitudinal position of zipper rails while they maintain the coupled state.

BACKGROUND ART

Generally, a variety of means, such as double-sided tape, Velcro, for fastening a plurality of objects to each other are used. Particularly, Velcro is widely used as representative fastening means, along with buttons, zippers, etc., because it is trouble-free and the installation of it is easy and it is easy to use.

The Velcro includes a first member which is provided with a plurality of locking hooks, and a second member which is provided with a plurality of catch loops. The first member and the second member are respectively installed on corresponding surfaces of objects and are fastened to or separated from each other depending on the coupling between the locking hooks and the catch loops.

However, in Velcro, if it is required to change relative positions between the first member and the second member after they have been fastened to each other, the first member must be separated from the second member and then re-fastened thereto after their relative positions are re-determined.

Therefore, a fastening structure which can facilitate coupling or removal between first and second members and a change in relative positions therebetween is required.

DISCLOSURE

Technical Problem

Accordingly, the present invention has been made keeping in mind the above problems occurring in the prior art, and an object of the present invention is to provide a fastening structure which enables a plurality of objects to be easily coupled to or removed from each other, and which enables the relative positions between the objects to be changed in the longitudinal position of zipper rails while they maintain the coupled state.

Technical Solution

In order to accomplish the above object, the present invention provides a fastening structure for fastening a plurality of objects to each other, the objects respectively having planar portions and facing each other, the fastening structure including a first zipper rail unit provided on a planar portion of a first object, the first zipper rail unit comprising a plurality of zipper rails made of elastic material and arranged parallel to each other, and a second zipper rail unit provided on a planar portion of a second object, the second zipper rail unit comprising another plurality of zipper rails made of elastic material and arranged parallel to each other, wherein while the zipper rails of the first zipper rail unit are individually coupled to the corresponding zipper rails of the second zipper rail unit in a female-male engagement manner, relative positions between the first object and the second object are able to be changed with respect to a longitudinal direction of the zipper rails.

Preferably, each of the zipper rail units may include a plurality of female zipper rails and male zipper rails made of elastic material and alternately arranged on at least one surface of a zipper rail plate, wherein a cross-sectional area of each of the female zipper rails is larger than a cross-sectional area of each of the male zipper rails, and the zipper rails of the pair of zipper rail units that correspond to each other are individually coupled to each other in the female-male engagement manner.

Preferably, each of the male zipper rails may include an extension part perpendicularly extending from the zipper rail plate, and a head part provided on an end of the extension part, the head part having an increased width. Each of the female zipper rails may comprise a receiving space defined both by surfaces of the extension parts and head parts of the adjacent male zipper rails and by a surface of the zipper rail plate.

Preferably, while the zipper rails of the pair of zipper rail units that correspond to each other are individually coupled to each other in the female-male engagement manner, each of the female zipper rails of one of the pair of zipper rail units and the corresponding male zipper rail of a remaining one of the pair of zipper rail units may be coupled to each other in such a way as to form at least two-point contact structure when seen in a sectional view.

Preferably, while the zipper rails of the pair of zipper rail units that correspond to each other are individually coupled to each other in the female-male engagement manner, each of the female zipper rails of one of the pair of zipper rail units and the corresponding male zipper rail of a remaining one of the pair of zipper rail units may be coupled to each other in such a way as to form a three-point contact structure when seen in a sectional view.

Preferably, the zipper rail unit may be provided on each of both sides of the zipper rail plate so that objects are fastened to each other to form a multi-layered structure, wherein the zipper rail units provided on the respective sides of the zipper rail plate may be oriented in the same direction.

Preferably, the zipper rail unit may be provided on each of both sides of the zipper rail plate so that objects are fastened to each other to form a multi-layered structure, wherein the zipper rail units provided on the respective sides of the zipper rail plate may be oriented such that the zipper rail units are inclined relative to each other at a predetermined angle.

Preferably, the zipper rail plate may have a planar shape so that the zipper rail plate can be attached to either one of the objects, and at least one perforated line may be formed in the zipper rail plate so that the zipper rail unit can be divided into a plurality of smaller zipper rail units.

Preferably, the zipper rail plate and the zipper rail unit may be integrally formed by extruding.

Preferably, the zipper rail plate and the zipper rail unit may be made of synthetic resin.

Preferably, the zipper rail unit may be provided on a first surface of the zipper rail plate, and an adhesive layer may be formed on a second surface of the zipper rail plate.

Preferably, the first object may comprise a mat plate comprising at least one piece of mat plate, the mat plate being attached to a planar support surface and having a first fastening surface provided with the zipper rail unit, and the second object may comprise an attachment member having a second fastening surface provided with the zipper rail unit so that the second fastening surface can be coupled to the first fastening surface of the mat plate.

Preferably, a base plate may be provided with a base picture formed on an upper surface thereof, wherein the first object may comprise a transparent platform placed on the upper surface of the base plate, the transparent platform having on a front surface thereof a first fastening surface provided with the zipper rail unit, and the second object may comprise a plurality of puzzle pieces, each of which has on a rear surface thereof a second fastening surface provided with the zipper rail unit so that the second fastening surface can be coupled to the first fastening surface of the transparent platform, with a piece of a picture formed on a front surface of each of the puzzle pieces, the piece of the picture corresponding to the base picture.

Preferably, a ring type accessory may be provided, and a fastening surface may be formed on at least one surface of the ring type accessory and extend in a longitudinal direction thereof, so that a user wears the ring type accessory in such a way that the fastening surface of a first end thereof that is provided with the zipper rail unit is coupled to the fastening surface of a second end thereof that is provided with the zipper rail unit, wherein the plurality of objects comprise the fastening surface of the first end and the fastening surface of the second end which are coupled to each other.

Preferably, the first object may comprise a base body having a first fastening surface provided with the zipper rail unit, and the second object may comprise a removable body having a second fastening surface provided with the zipper rail unit so that the second fastening surface can be coupled to the first fastening surface of the base body.

Preferably, a plurality of coupling blocks may be provided, each of the coupling blocks having on at least one surface thereof a fastening surface provided with the zipper rail unit, wherein the plurality of objects comprise the respective fastening surfaces of the coupling blocks that face each other.

Preferably, a file and a file storage container may be provided, the file storage container comprising a pair of side plates, a bottom plate and a rear plate such that the file can be put into the file storage container, wherein the first object may comprise the rear plate provided with the zipper rail unit, and the second object may comprise a surface of the file that is provided with the zipper rail unit and is brought into contact with the rear plate.

Preferably, an assembly box may be provided, the assembly box including a plurality of base flaps and a plurality of fastening flaps, wherein the plurality of objects may comprise the base flaps, each of which is provided with the zipper rail unit, and the fastening flaps, each of which is provided with the zipper rail unit.

Preferably, the first object may comprise a card panel having, on at least one surface thereof, a first fastening surface provided with the zipper rail unit, and the second object may comprise a magnetic panel having, on a first surface thereof, a second fastening surface provided with the zipper rail unit so that the second fastening surface can be coupled to a portion or an entirety of the first fastening surface of the base body, with a magnetic strip provided on a second surface of the magnetic panel.

Preferably, the first object may comprise a handle having, on at least one surface thereof, a first fastening surface provided with the zipper rail unit, the handle being installed in a passenger compartment of a public transportation means, and the second object may comprise an advertisement panel having, on a first surface thereof, a second fastening surface provided with the zipper rail unit so that the second fastening surface can be coupled to the first fastening surface, with an advertisement surface formed on a second surface of the advertisement panel.

Preferably, the first object may comprise an object having, on one surface thereof, a first fastening surface provided with the zipper rail unit, and the second object may comprise an icon attachment member removably coupled to the first fastening surface, the icon attachment member having, on a first surface thereof, a second fastening surface provided with the zipper rail unit so that the second fastening surface can be coupled to the first fastening surface, with an icon provided on a second surface of the icon attachment member.

Preferably, the first object may comprise a cellular phone strap having at least one planar surface, wherein the first fastening surface is provided on the planar surface.

Preferably, the first object may comprise a cellular phone case enclosing an outer surface of a cellular phone, wherein the first fastening surface is provided on an outer surface of the cellular phone case.

Preferably, the first object may comprise a planar object having a first fastening surface provided with the zipper rail unit, and the second object may comprise an educational item having, on a first surface thereof, a second fastening surface provided with the zipper rail unit so that the second fastening surface can be coupled to the first fastening surface, with an educational image formed on a second surface of the educational item.

Preferably, a base plate having a predetermined shape may be provided, with an image formed on a front surface of the base plate, wherein the first object may comprise a transparent platform placed on the front surface of the base plate, the transparent platform having on a front surface thereof a first fastening surface provided with the zipper rail unit, and the second object may comprise a decoration plate having, on a rear surface thereof, a second fastening surface provided with the zipper rail unit so that the second fastening surface can be coupled to the first fastening surface of the transparent platform, the decoration plate having, on a front surface thereof, an image different from the image formed on the base plate.

Preferably, the planar portion of the first object may comprise an inner page of a book, and the second object may comprise a content element changing a position thereof relative to a background formed on the inner page, thus varying a visual effect.

Preferably, the planar portion of the first object may comprise an inner pop-up page of a pop-up book, and the second object may comprise a content element changing a position thereof relative to a background formed on the inner pop-up page, thus varying a visual effect.

Preferably, the fastening structure may further include a planar medial object interposed between the first object and the second object, the planar medial object having: a third zipper rail unit provided on one planar portion of the planar medial object and comprising a plurality of zipper rails made of elastic material and arranged parallel to each other; and a fourth zipper rail unit provided on an opposite planar portion of the planar medial object and comprising another plurality of zipper rails made of elastic material and arranged parallel to each other, wherein the first object my comprise a top-level post surface of a noticeboard, the medial object comprises a medial-level post surface that is smaller than the first object, and the second object may comprise a bottom-level post surface that is smaller than the medial object, and the top-level post surface, the medial-level post surface and the bottom-level post surface can be selectively attached to each other or removed from each other and/or successively moved and rearranged.

Advantageous Effects

A fastening structure according to the present invention facilitates coupling or removal between a plurality of objects and makes it possible to change relative positions therebetween even when they are in the coupled state.

Furthermore, the fastening structure may further include a medial object which has zipper rail units on respective opposite sides thereof. The zipper rail units of the medial object are oriented in the same direction or are inclined to each other at a predetermined angle so that the relative positions between the objects or the relative orientations of the objects can be changed in a variety of ways.

Further, each zipper rail unit can be attached to the corresponding object by an adhesive. The fastening structure of the present invention can be easily applied to existing objects.

Each female zipper rail of the zipper rail unit of one side object is coupled to a corresponding male zipper rail of the zipper rail unit of the other side object in such a way that they form a two-point contact structure when seen in the sectional view, thus minimizing friction therebetween. Therefore, a change in the relative positions between the objects can be facilitated.

Alternatively, each female zipper rail of the zipper rail unit of one side object may be coupled to a corresponding male zipper rail of the zipper rail unit of the other side object in such a way that they form a three-point contact structure when seen from the sectional view, so that friction therebetween can be reduced. Thereby, the relative positions between the objects can be easily changed.

The two- or three-point contact structure can be selectively formed by adjusting conditions of formation of the female zipper rails and the male zipper rails, whereby the magnitude of the friction between the zipper rail unit of one side object and the zipper rail unit of the other side object can be controlled.

BEST MODE

Figure 1:
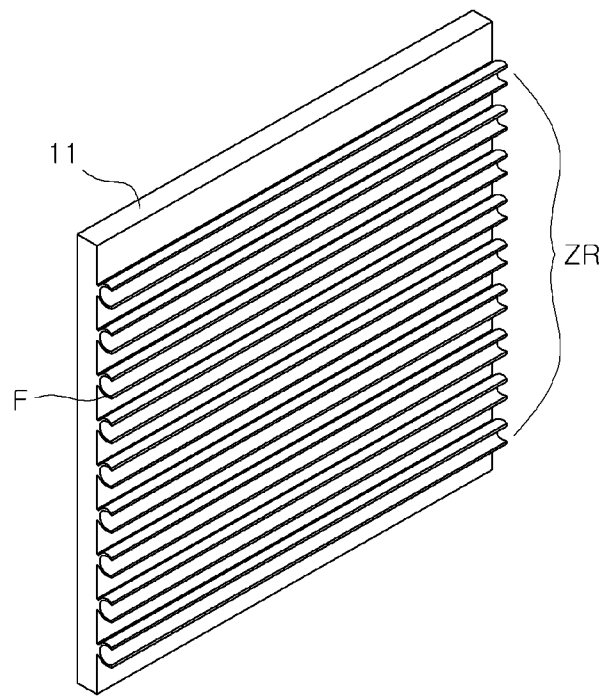
FIG. 1 is a perspective view illustrating a first structure of a zipper rail unit provided on an object, according to an embodiment of the present invention.

The present invention may be embodied in many different forms without departing from the spirit and significant characteristics of the invention. Therefore, the embodiments of the present invention are disclosed only for illustrative purposes and should not be construed as limiting the present invention.

It will be understood that, although the terms first, second, etc. may be used herein to describe various elements, these elements should not be limited by these terms.

These terms are only used to distinguish one element, from another element. For instance, a first element discussed below could be termed a second element without departing from the teachings of the present invention. Similarly, the second element could also be termed the first element.

The term "and/or" includes any and all combinations of one or more of the associated listed items.

It will be understood that when an element is referred to as being "coupled" or "connected" to another element, it can be directly coupled or connected to the other element or intervening elements may be present therebetween.

In contrast, it should be understood that when an element is referred to as being "directly coupled" or "directly connected" to another element, there are no intervening elements present.

The terminology used herein is for the purpose of describing particular embodiments only and is not intended to be limiting. As used herein, the singular forms "a," "an" and "the" are intended to include the plural forms as well, unless the context clearly indicates otherwise.

It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which this invention belongs.

It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, preferred embodiments of the present invention will be described in detail with reference to the attached drawings. The same reference numerals will be used throughout the different drawings to designate the same or similar components, and the repetition of the same explanation for these components will be skipped.

If in the specification, detailed descriptions of well-known functions or configurations would unnecessarily obscure the gist of the present invention, the detailed descriptions will be omitted.

A fastening structure according to an embodiment of the present invention functions to fasten a plurality of objects that have approximately planar portions to each other. The fastening structure includes a first zipper rail unit and a second zipper rail unit.

The first zipper rail unit includes a plurality of zipper rails which are made of elastic material and are arranged parallel to each other. The first zipper rail unit is disposed on a planar portion of a first object.

The second zipper rail unit includes another plurality of zipper rails which are made of elastic material and are arranged parallel to each other. The second zipper rail unit is disposed on a planar portion of a second object.

The zipper rails of the first zipper rail unit are individually coupled to the corresponding zipper rails of the second zipper rail unit in a female-male engagement manner, thus fastening the first object and the second object to each other.

While the zipper rails of the first zipper rail unit are individually coupled to the corresponding zipper rails of the second zipper rail unit in a female-male engagement manner, the first zipper rail unit and the second zipper rail unit apply predetermined frictional force to each other because of contact therebetween.

The first zipper rail unit and the second zipper rail unit can be maintained in the coupled state by the frictional force therebetween.

In the present invention, while the first object and the second object are fastened to each other by the first zipper rail unit and the second zipper rail unit, the first object and the second object can move relative to each other in the longitudinal direction of the zipper rails.

The relative movement between the first and second objects is realized by applying force that overcomes the frictional force between the first and second zipper rail units to the first object or the second object in the longitudinal direction of the zipper rails.

The first zipper rail unit and the second zipper rail unit can have various shapes. Representative examples of these will be illustrated with reference to FIGS. 1 through 3.

As shown in FIG. 1, the first zipper rail unit ZR includes a plurality of female zipper rails F which are arranged at regular intervals. The female zipper rails F are provided on a surface of a first object 11 that is approximately planar.

Figure 2:
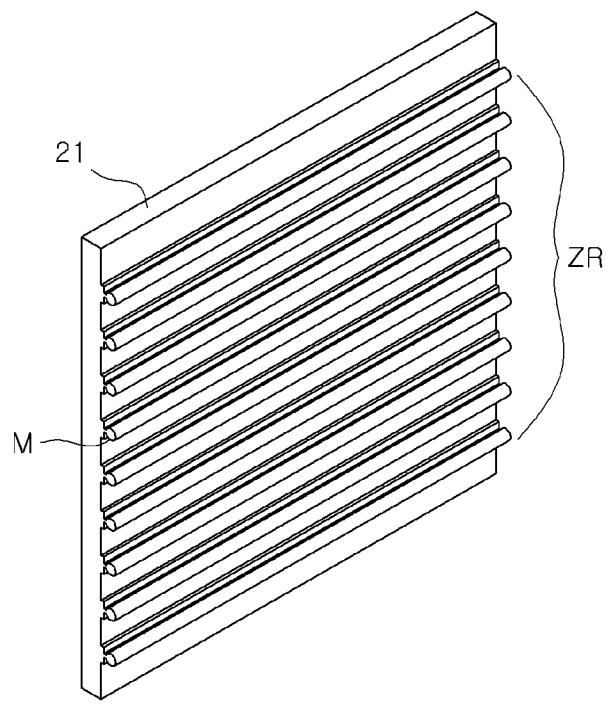
FIG. 2 is a perspective view illustrating a second structure of a zipper rail unit provided on an object according to the embodiment of the present invention.
Figure 3:
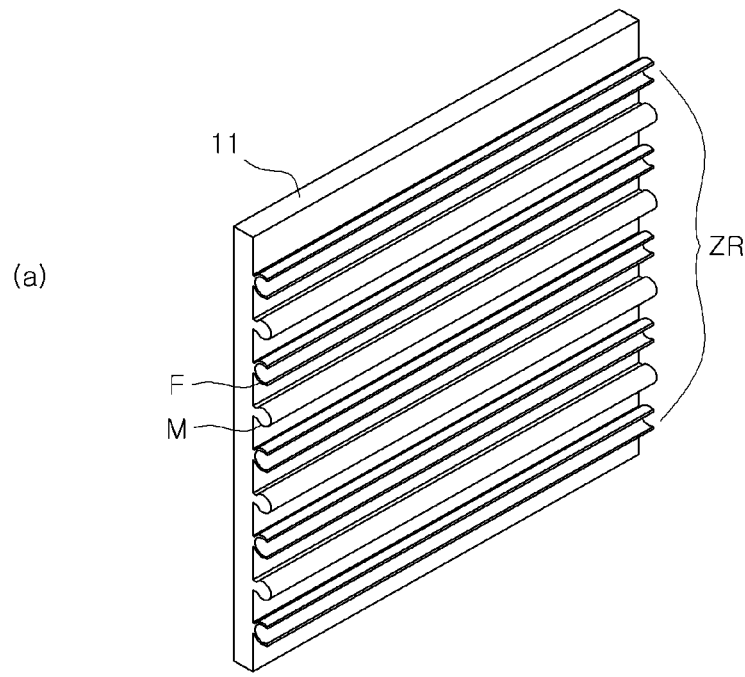
FIG. 3 is of perspective views illustrating third structures of zipper rail units provided on objects, according to an embodiment of the present invention.
Figure 3:
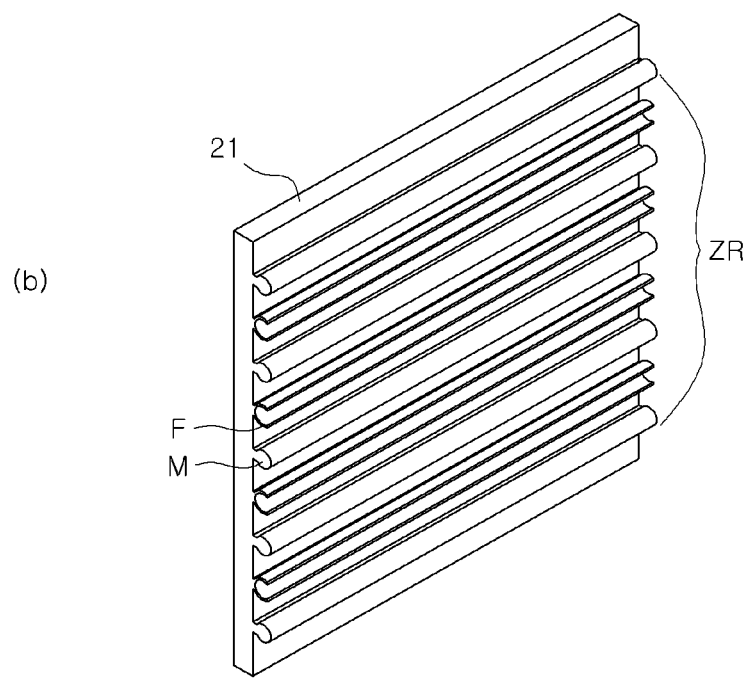

As shown in FIG. 2, the second zipper rail unit ZR includes a plurality of male zipper rails M which are arranged at regular intervals. The male zipper rails M are provided on a surface of a second object 21 that is approximately planar.

As stated above, the first zipper rail unit ZR that includes the arranged female zipper rails F is provided on the planar portion of the first object 11, while the second zipper rail unit ZR that includes the arranged male zipper rails M is provided on the planar portion of the second object 21.

In this structure, the first object 11 and the second object 21 can be fastened to each other by engaging the female zipper rails F with the corresponding male zipper rails M.

Furthermore, even after the first object 11 and the second object 21 have been fastened to each other, relative positions between the first object 11 and the second object 21 can be changed with respect to the longitudinal direction of the zipper rails M and F.

For instance, the second object 21 may move in the longitudinal direction of the zipper rails M and F while the first object 11 is fixed.

Alternatively, the first object 11 may move in the longitudinal direction of the zipper rails M and F while the second object 21 is fixed As a further alternative, the first object 11 and the second object 21 may move relative to each other in the longitudinal direction of the zipper rails M and F at the same time.

The fastening structure has been illustrated as being configured such that the first zipper rail unit ZR including the arranged female zipper rails F is provided on the planar portion of the first object 11 while the second zipper rail unit ZR including the arranged male zipper rails M is provided on the planar portion of the second object 21, and vice versa.

In other words, a first zipper rail unit including male zipper rails M that are arranged at regular intervals may be provided on the planar portion of the first object 11, and a second zipper rail unit including female zipper rails F that are arranged at regular intervals may be provided on the planar portion of the second object 21.

As shown in FIG. 3(a), the first zipper rail unit ZR may be configured such that the female zipper rails F and the male zipper rails M are alternately arranged at regular intervals. The female zipper rails F and the male zipper rails M are provided on a surface of a first object 11 that is approximately planar.

In this case, the second zipper rail unit ZR may also be configured such that the female zipper rails F and the male zipper rails M are alternately arranged at regular intervals. These female zipper rails F and male zipper rails M are provided on a surface of a second object 21 that is approximately planar.

As such, the first zipper rail unit ZR configured such that the female zipper rails F and the male zipper rails M are alternately arranged may be provided on the planar portion of the first object 11, and the second zipper rail unit ZR configured such that the female zipper rails F and the male zipper rails M are alternately arranged may be provided on the planar portion of the second object.

In this structure, the first object 11 and the second object 21 can be fastened to each other by coupling the female zipper rails F and male zipper rails M of the first object 11 to the corresponding respective male zipper rails M and female zipper rails F of the second object 21 in a female-male engagement manner.

Furthermore, while the female zipper rails F and male zipper rails M of the first object 11 are individually coupled to the corresponding male zipper rails M and female zipper rails F of the second object 21 in the female-male engagement manner, the first object 11 and the second object 21 can move relative to each other in the longitudinal direction of the zipper rails.

As described above, in the fastening structure according to the embodiment of the present invention, for example, the first zipper rail unit ZR may be configured such that the female zipper rails F are arranged at regular intervals.

Alternatively, the first zipper rail unit ZR may be configured such that the male zipper rails M are arranged at regular intervals.

As a further alternative, the first zipper rail unit ZR may be configured such that the female zipper rails F and the male zipper rails M are alternately arranged at regular intervals.

Meanwhile, to make it possible to couple the second zipper rail unit ZR to the first zipper rail unit ZR, for example, the second zipper rail unit ZR may be configured such that the male zipper rails M are arranged at regular intervals.

Alternatively, the second zipper rail unit ZR may be configured such that the female zipper rails F are arranged at regular intervals.

As a further alternative, the second zipper rail unit ZR may be configured such that the female zipper rails F and the male zipper rails M are alternately arranged at regular intervals.

Figure 4:
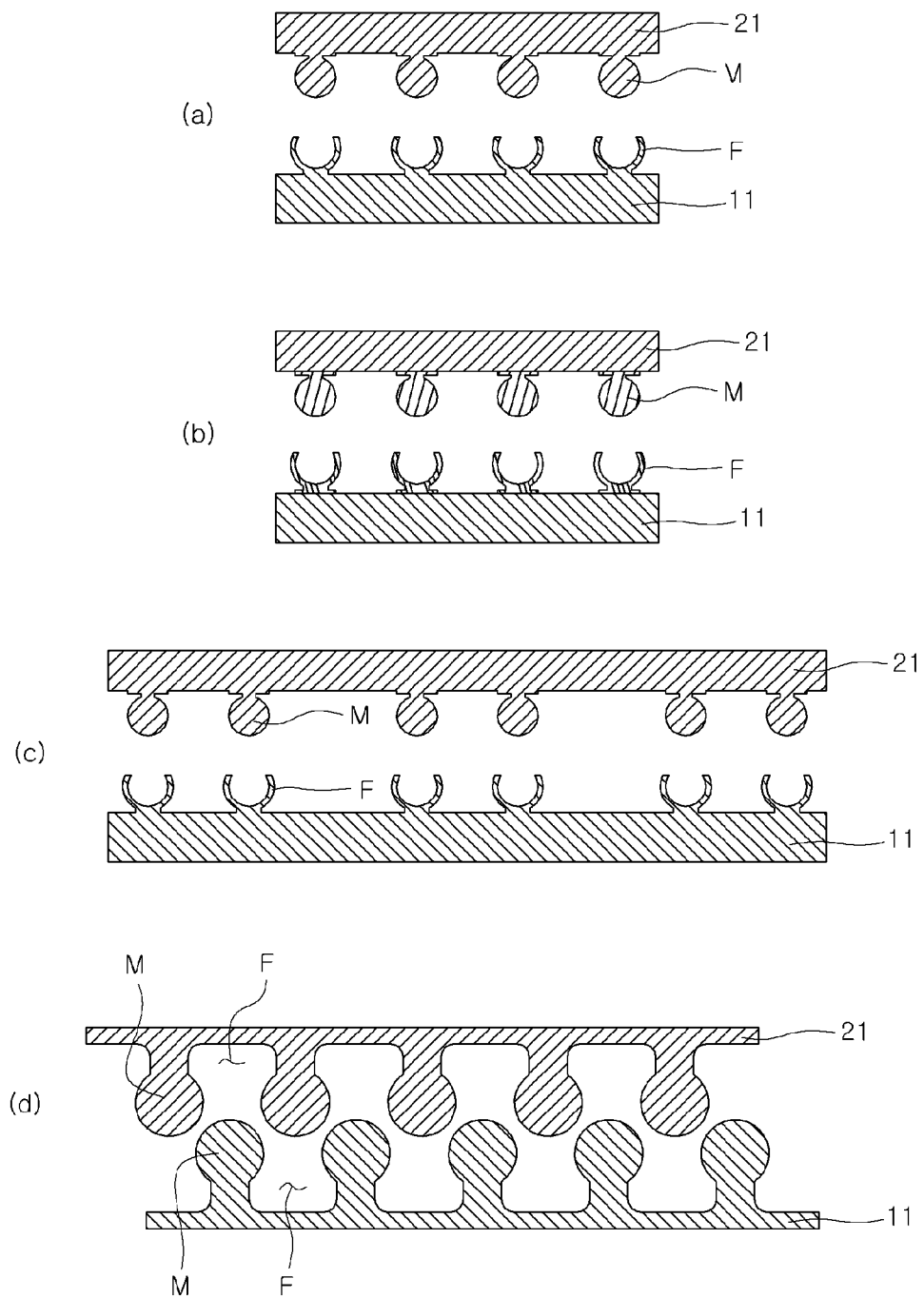
FIG. 4 is of sectional views showing a variety of structures of female zipper rails and male zipper rails according to an embodiment of the present invention.

As shown in FIG. 4(a), the first zipper rail unit ZR and the second zipper rail unit ZR may be integrally formed on the objects 11 and 21.

Alternatively, as shown in FIG. 4(b), they may be attached to the planar portions of the objects 11 and 21 after having been separately manufactured.

As shown in FIG. 4(c), each of the first and second zipper rail units may include plural pairs of zipper rails which are arranged at regular intervals.

As shown in FIG. 4(d), the fastening structure may be configured in such a way that male zipper rails M and female zipper rails F are alternately arranged.

Here, each female zipper rail F may comprise a receiving space which is defined by surfaces of adjacent male zipper rails M and a surface of the object. This structure will be described in more detail later herein.

Each zipper rail unit ZR includes the female zipper rails F and/or the male zipper rails M and is made of elastic material such as synthetic resin. Therefore, the female zipper rails F and the male zipper rails M can be elastically coupled to each other by compressing them to each other in such a way that the male zipper rails M are force-fitted into the corresponding female zipper rails F.

The fastening structure according to the embodiment of the present invention basically includes the first zipper rail unit and the second zipper rail unit, wherein it may further include a planar medial object.

The planar medial object includes a third zipper rail unit which corresponds to the first zipper rail unit, and a fourth zipper rail unit which corresponds to the second zipper rail unit.

Hereinafter, the third zipper rail unit and the fourth zipper rail unit that are provided on the medial object will be explained.

The third zipper rail unit that corresponds to the first zipper rail unit is provided on a planar portion of a first side of the medial object. The fourth zipper rail unit that corresponds to the second zipper rail unit is provided on a planar portion of a second side of the medial object that is opposed to the first side thereof.

Each of the third and the fourth zipper rail units includes a plurality of zipper rails which are made of elastic material and are arranged parallel to each other.

In the same manner as the first zipper rail unit or the second zipper rail unit, each of the third and the fourth zipper rail units may be, for example, arranged such that female zipper rails are arranged at regular intervals.

Alternatively, each of the third and the fourth zipper rail units may be configured such that male zipper rails are arranged at regular intervals.

As a further alternative, each of the third and the fourth zipper rail units may be configured such that female zipper rails and male zipper rails are alternately arranged at regular intervals.

In the above-described structure of the third zipper rail unit and the fourth zipper rail unit, while the zipper rails of the third zipper rail unit are individually coupled to the corresponding zipper rails of the first zipper rail unit in the female-male engagement manner, relative positions between the first object and the medial object can be changed in the longitudinal direction of the zipper rails.

Furthermore, while the zipper rails of the fourth zipper rail unit are individually coupled to the corresponding zipper rails of the second zipper rail unit in the female-male engagement manner, relative positions between the medial object and the second object can also be changed in the longitudinal direction of the zipper rails.

The third zipper rail unit provided on the first side of the medial object and the fourth zipper rail unit provided on the second side of the medial object can be combined in a multitude of different ways. Examples of such combinations will be explained with reference to FIGS. 5 through 8.

Figure 5:
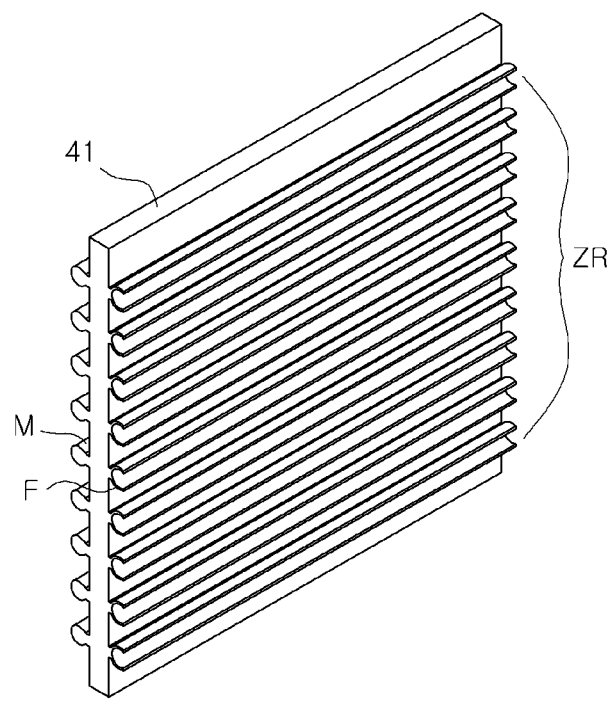
FIG. 5 is a perspective view showing a first structure of a zipper rail unit provided on a medial object according to an embodiment of the present invention.

As shown in FIG. 5, the female zipper rails F may be arranged at regular intervals on a first side of a medial object 41, thus forming the third zipper rail unit ZR.

In addition, the male zipper rails M may be arranged at regular intervals on a second side of the medial object 41 and oriented in the same direction as that of the female zipper rails F, thus forming the fourth zipper rail unit ZR.

Figure 6:
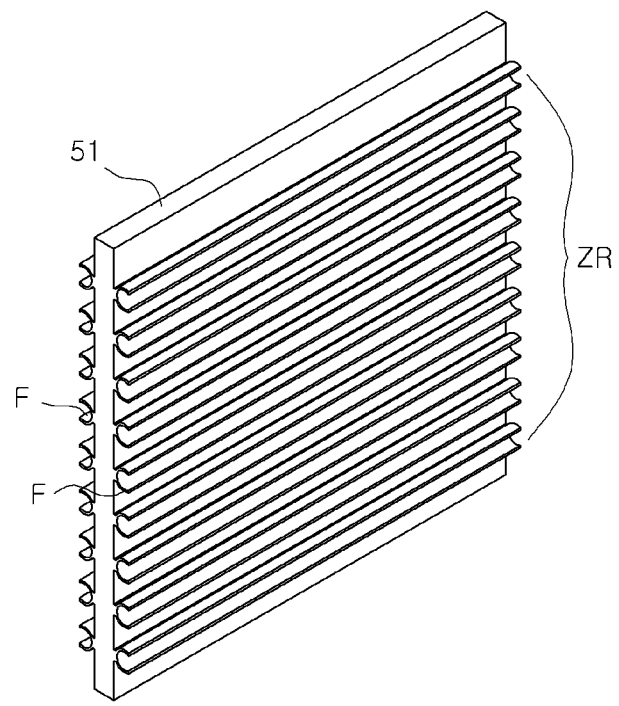
FIG. 6 is a perspective view showing a second structure of the zipper rail unit provided on the medial object according to an embodiment of the present invention.

Alternatively, as shown in FIG. 6, the female zipper rails F may be arranged at regular intervals on both sides of a medial object 51 and oriented in the same direction, thus forming the third zipper rail unit ZR and the fourth zipper rail unit ZR.

Figure 7:
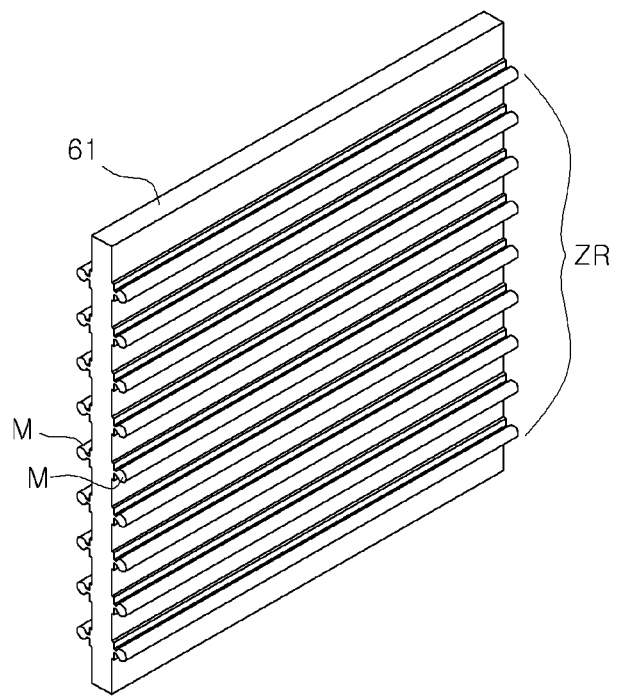
FIG. 7 is a perspective view showing a third structure of the zipper rail unit provided on the medial object according to an embodiment of the present invention.

As a further alternative, as shown in FIG. 7, the male zipper rail M may be arranged at regular intervals on both sides of a medial object 61 and oriented in the same direction, thus forming the third zipper rail unit ZR and the fourth zipper rail unit ZR.

On the other hand, the third zipper rail unit ZR provided on the first side of the medial object and the fourth zipper rail unit ZR provided on the second side of the medial object may be oriented such that they are angled to each other.

Figure 8:
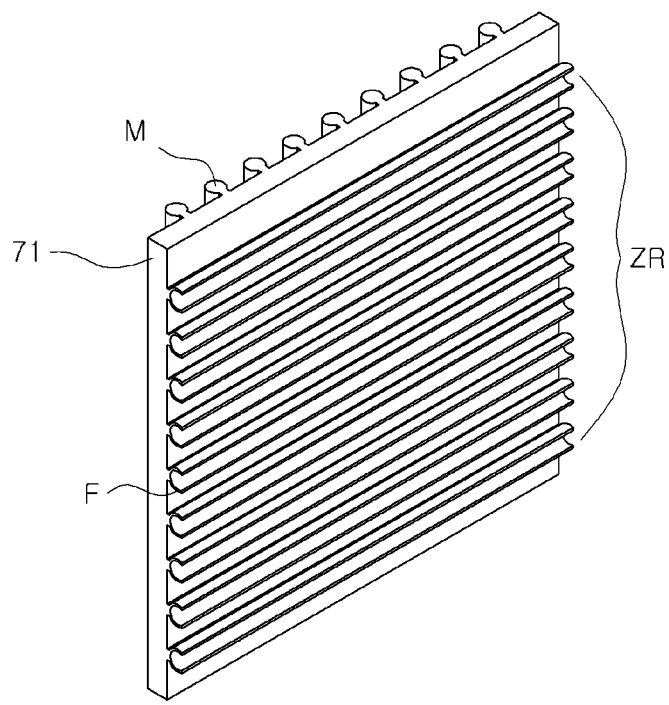
FIG. 8 is a perspective view showing a fourth structure of the zipper rail unit provided on the medial object according to an embodiment of the present invention.

For example, as shown in FIG. 8, the female zipper rails F and the male zipper rails M may be oriented such that they cross at approximately right angles.

Besides the examples illustrated in FIGS. 5 through 8, the female zipper rails F and the male zipper rails M can be provided on the medial object combined in a variety of different ways, for example, the female zipper rails F and the male zipper rails M may be alternately arranged at regular intervals on the first or second side of the medial object.

Although the structure for fastening the three objects including the first object, the medial object and the second object has been illustrated, the structure for fastening four or more objects, having a plurality of medial objects, also falls within the bounds of the present invention, of course.

Below a "noticeboard" will be explained as an embodiment of the fastening structure that uses the first zipper rail unit, the second zipper rail unit, the third zipper rail unit and the fourth zipper rail unit.

Figure 9:
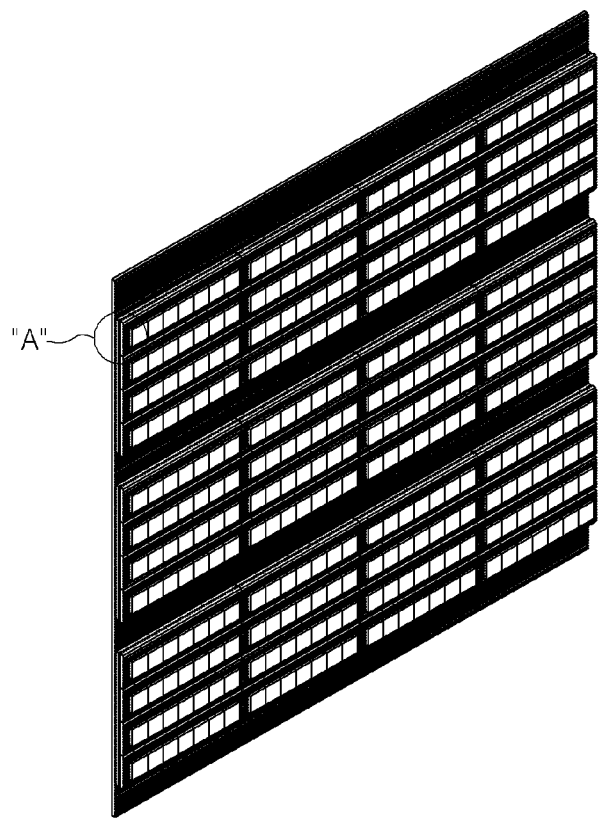
FIG. 9 is a perspective view showing a noticeboard according to an embodiment of the present invention.
Figure 10:
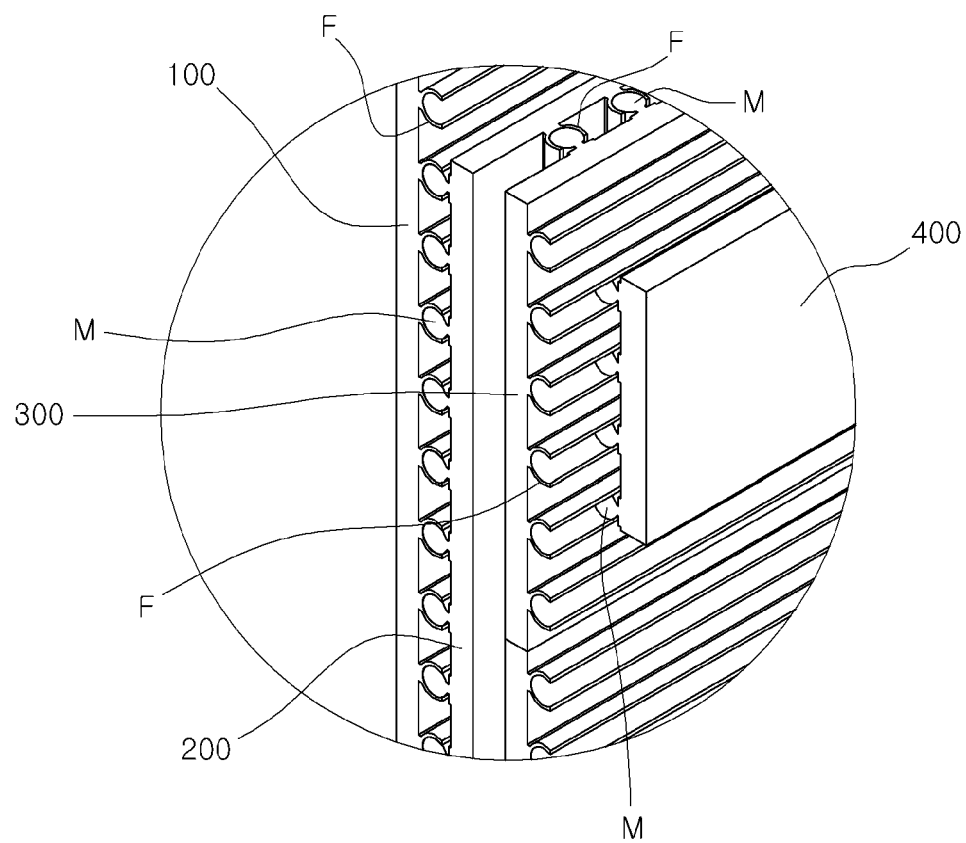
FIG. 10 is an enlarged view of a circle portion "A" of FIG. 9.
Figure 11:
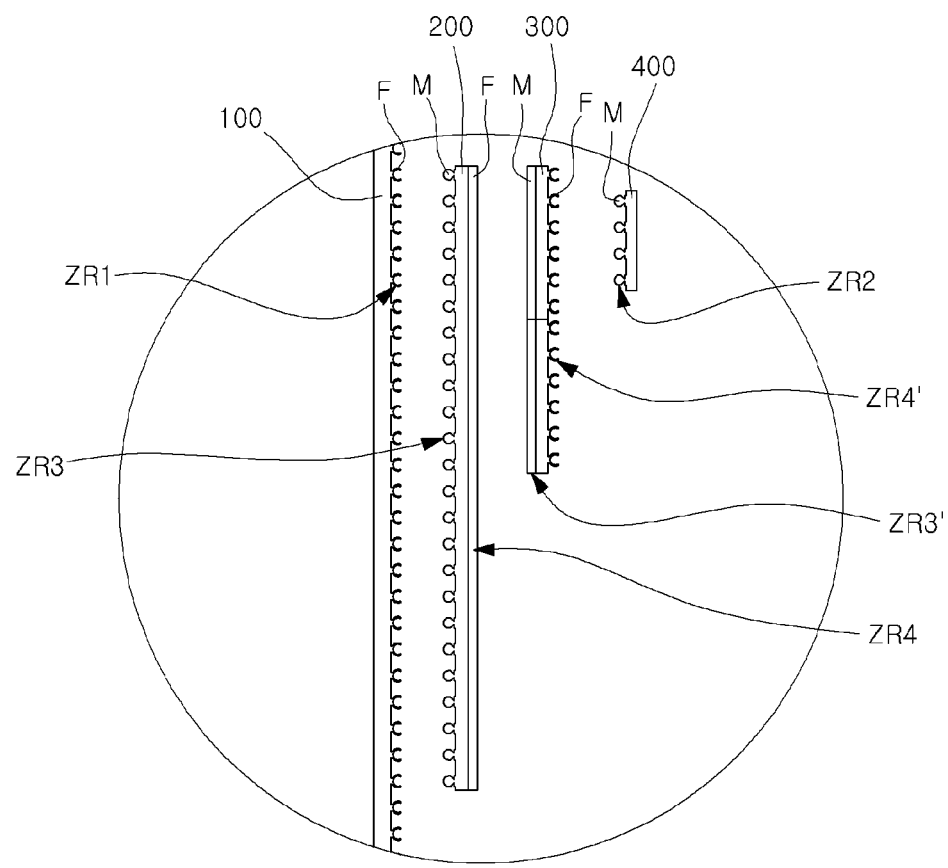
FIG. 11 is a side view illustrating a portion of the noticeboard according to an embodiment of the present invention.

As shown in FIGS. 9 through 11, the noticeboard of this embodiment includes a base member 100, month-unit members 200, week-unit members 300 and day-unit members 400.

The base member 100 forms a top-level post surface and is attached to a wall or the like of a room. Female zipper rails F are arranged on a front surface of the base member 100, thus forming a first zipper rail unit ZR1. In this embodiment, the female zipper rails F are oriented in the horizontal direction and spaced apart from each other at regular intervals with respect to the vertical direction.

Each month-unit member 200 forms a medial-level post surface which is smaller than the base member 100. The month-unit members 200 are attached to the front surface of the base member 100.

Male zipper rails M are arranged on a rear surface of the month-unit member 200, thus forming a third zipper rail unit ZR3. The male zipper rails M are oriented in the horizontal direction and spaced apart from each other at regular intervals with respect to the vertical direction so that the third zipper rail unit ZR3 can be removably attached to the first zipper rail unit ZR1 and/or move relative to the first zipper rail unit ZR1.

Female zipper rails F, which are oriented in the vertical direction and spaced apart from each other at regular intervals with reference to the horizontal direction, are arranged on a front surface of the month-unit member 200, thus forming a fourth zipper rail unit ZR4.

Each week-unit member 300 forms a medial-level post surface which is smaller than the month-unit member 200. The week-unit members 300 are attached to the front surface of each month-unit member 200.

Male zipper rails M are arranged on a rear surface of the week-unit member 300, thus forming a sub-third zipper rail unit ZR3'. The male zipper rails M of the sub-third zipper rail unit ZR3' are oriented in the vertical direction and spaced apart from each other at regular intervals with respect to the horizontal direction so that the sub-third zipper rail unit ZR3' can be removably attached to the fourth zipper rail unit ZR4 and/or move relative to the fourth zipper rail unit ZR4.

Female zipper rails F, which are oriented in the horizontal direction and spaced apart from each other at regular intervals with reference to the vertical direction, are arranged on a front surface of the week-unit member 300, thus forming a sub-fourth zipper rail unit ZR4'.

Each day-unit member 400 forms a bottom-level post surface which is smaller than the week-unit member 300. The day-unit members 400 are attached to the front surface of each week-unit member 300.

Male zipper rails M are arranged on a rear surface of the day-unit member 400, thus forming a second zipper rail unit ZR2. The male zipper rails M of the second zipper rail unit ZR2 are oriented in the horizontal direction and spaced apart from each other at regular intervals with respect to the vertical direction so that the second zipper rail unit ZR2 can be removably attached to the sub-fourth zipper rail unit ZR4' and/or move relative to the sub-fourth zipper rail unit ZR4'.

A record panel on which a variety of characters are put is provided on a front surface of each day-unit member 400. For example, a date or the like is written on the record panel.

In the above-mentioned fastening structure, the base member 100, the month-unit members 200, the week-unit members 300 and the day-unit members 400 can be selectively coupled to or separated from each other and/or successively moved and disposed at desired positions.

An example of yearly use of the noticeboard will be explained with reference to FIGS. 12 through 18. Here, three rows on the noticeboard will be called a "first row", a "second row" and a "third row" in positional order from the top to the bottom.

Figure 12:
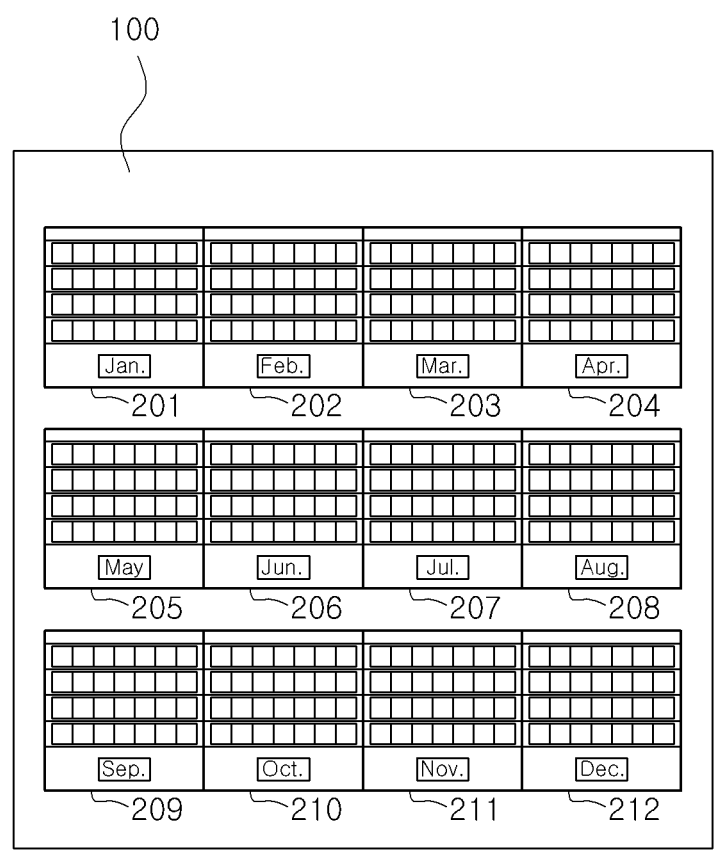
FIG. 12 is a front view illustrating the noticeboard according to the present invention.

As shown in FIG. 12, at the initial stage, the first row includes a "January" member 201, a "February" member 202, a "March" member 203 and an "April" member 204 which are attached to the base member 100 in positional order from the left to the right.

The second row includes a "May" member 205, a "June" member 206, a "July" member 207 and an "August" member 208 which are attached to the base member 100 in positional order from the left to the right.

The third row includes a September-unit member 209, an "October" member 210, a "November" member 211 and a "December" member 212 which are attached to the base member 100 in positional order from the left to the right.

Figure 13:
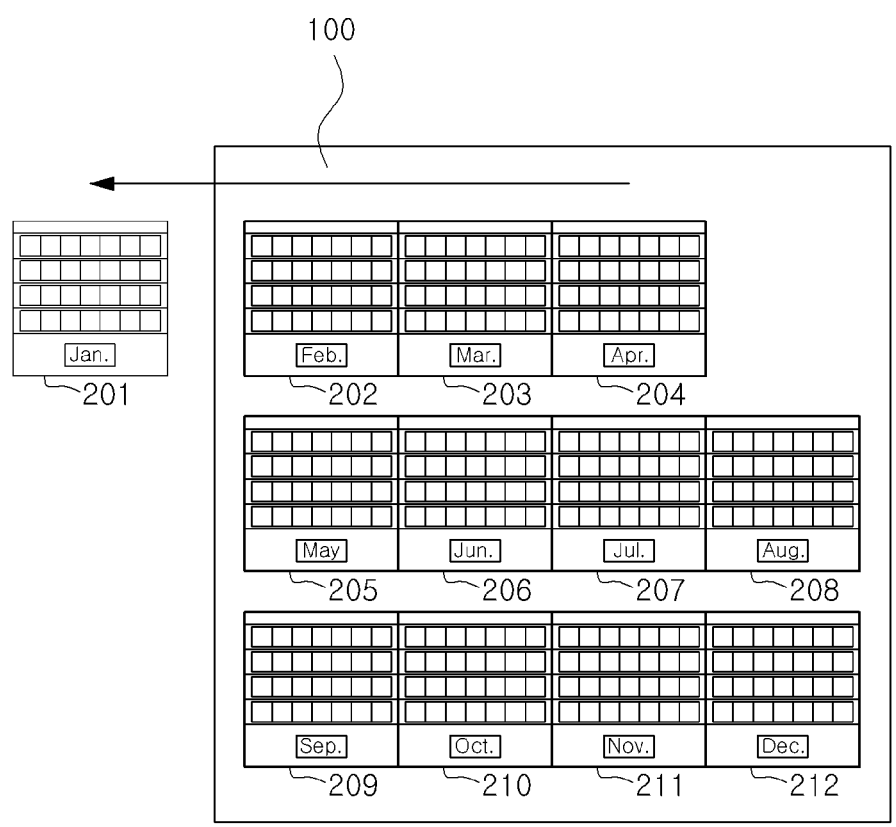
FIG. 13 is a front view of the noticeboard to illustrate a process of removing a "January" member which has been positioned at the leftmost side of a first row of the noticeboard and shifting a "February" member, a "March" member and an "April" member to the left, according to the present invention.

When February begins after January has passed, to position contents pertaining to February at the leftmost side, as shown in FIG. 13, the "January" member 201 slides to the left and is separated from the base member 100. The "February" member 202, the "March" member 203 and the "April" member 204 thereafter slide to the left so that the "February" member 202 is located at the leftmost position of the first TOW.

The sliding the "February" member 202, the "March" member 203 and the "April" member 204 to the left can be realized in such a way that as the "April" member 204 slides to the left, the "March" member 203 and the "February" member 202 also slide in a row to the left along with the "April" member 204.

Figure 14:
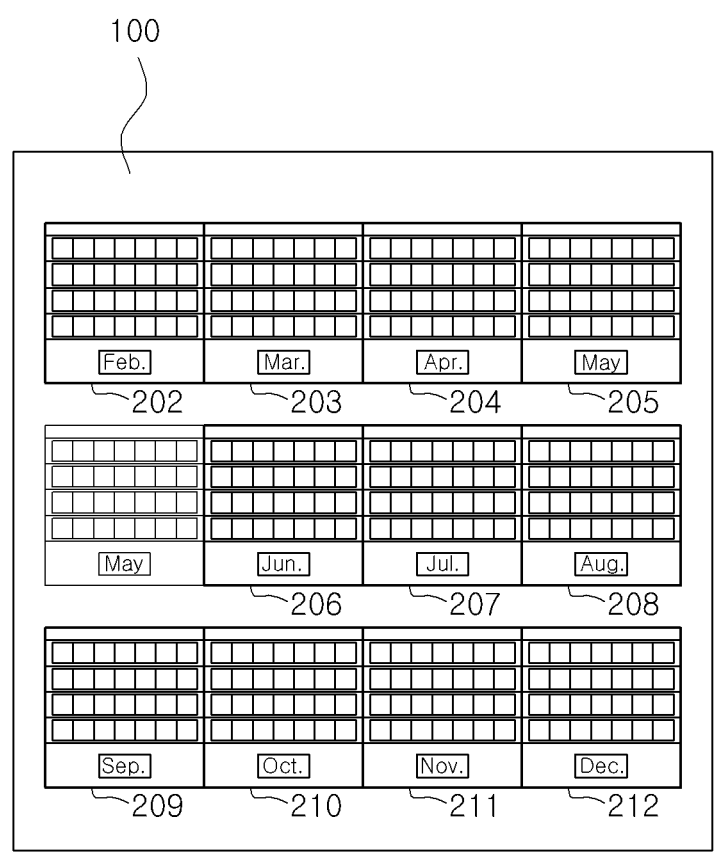
FIG. 14 is a front view illustrating a process of separating a "May" member from a second row of the noticeboard and attaching it to the rightmost end of the first row according to the present invention.

As shown in FIG. 14, thereafter, the "May" member 205 that has been positioned at the leftmost side of the second row is separated from the second row and then attached to the rightmost side of the first row.

Figure 15:
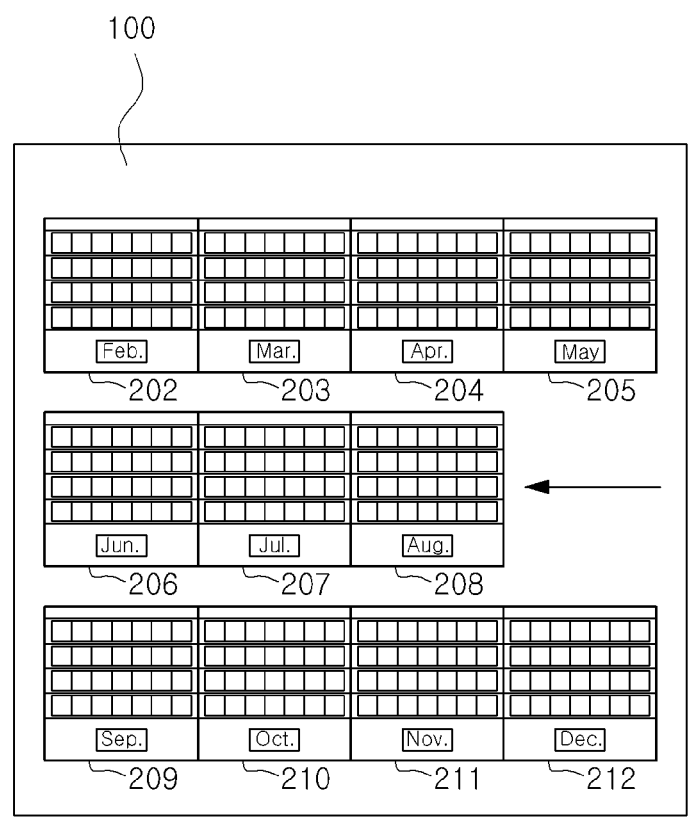
FIG. 15 is a front view illustrating a "June" member, a "July" member and an "August" member shifted to the left on the second row of the noticeboard according to the present invention.

Subsequently, as shown in FIG. 15, the "June" member 206, the "July" member 207 and the "August" member 208 of the second row slide to the left so that the "June" member 206 is positioned at the leftmost side of the second row.

The sliding of the "June" member 206, the "July" member 207 and the "August" member 208 to the left can be realized in such a way that as the "August" member 208 slides to the left, the "July" member 207 and "June" member 206 also slide in a row to the left along with the "August" member 208.

Figure 16:
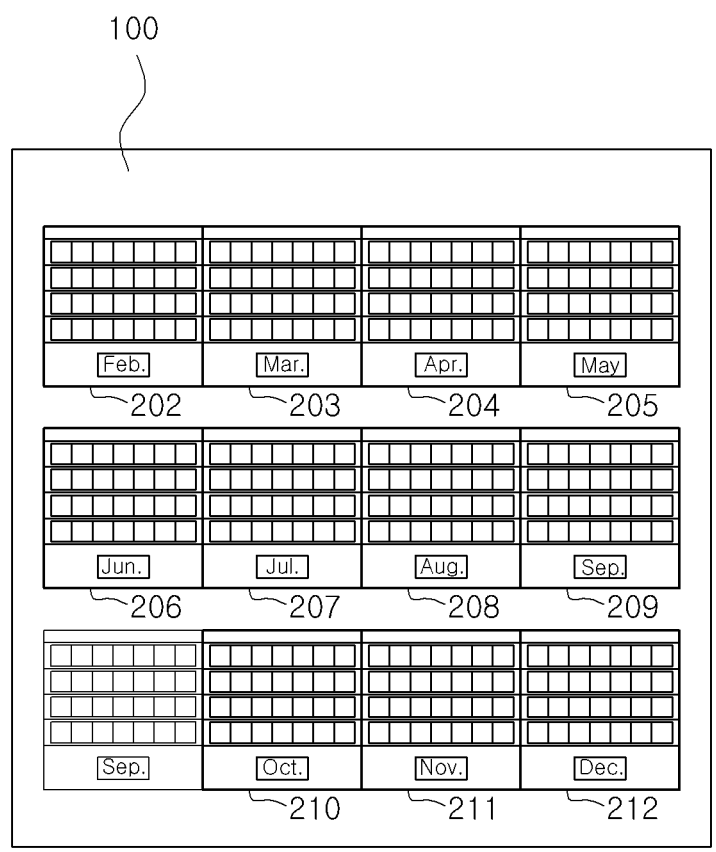
FIG. 16 is a front view illustrating a process of separating a "September" member from a third row of the noticeboard and attaching it to the rightmost end of the second row according to the present invention.

As shown in FIG. 16, thereafter, the September-unit member 209 that has been positioned at the leftmost side of the third row is separated from the third row and then attached to the rightmost side of the second row.

Figure 17:
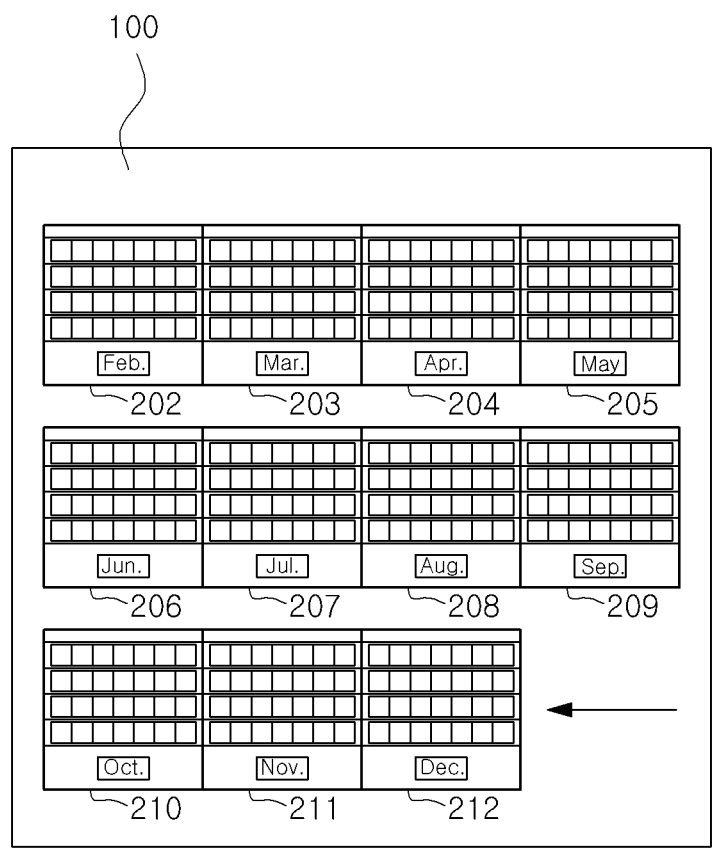
FIG. 17 is a front view illustrating an "October" member, a "November" member and a "December" member shifted to the left on the third row of the noticeboard according to the present invention.

Subsequently, as shown in FIG. 17, the "October" member 210, the "November" member 211 and the "December" member 212 of the third row slide to the left so that the "October" member 210 is positioned at the leftmost side of the third row.

The sliding of the "October" member 210, the "November" member 211 and the "December" member 212 to the left can be realized in such a way that as the "December" member 212 slides to the left, the "November" member 211 and "October" member 210 also slide in a row to the left along with the "December" member 212.

Figure 18:
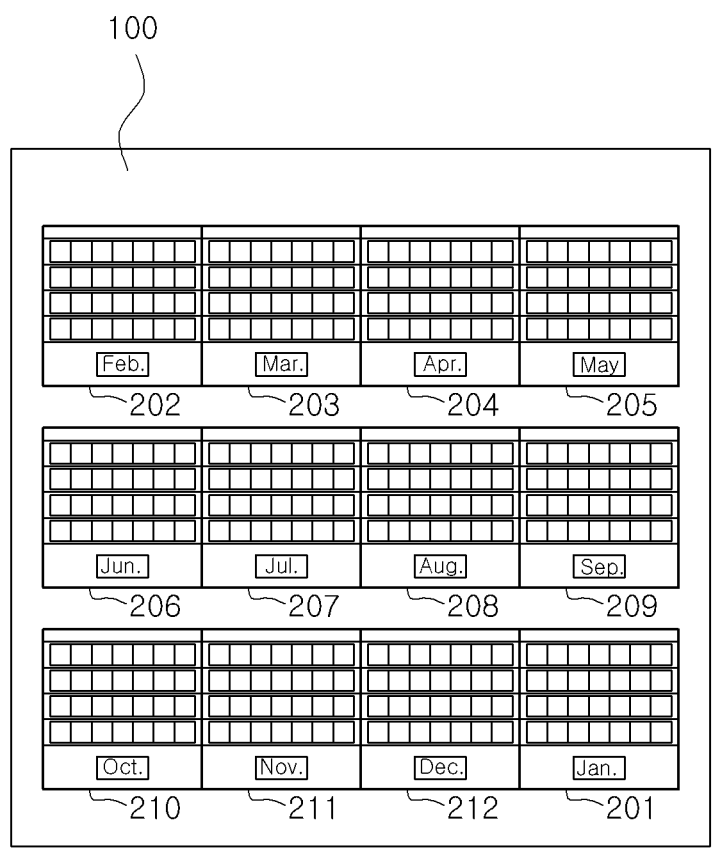
FIG. 18 is a front view illustrating a new "January" member attached to the rightmost end of the third row of the noticeboard according to the present invention.

As shown in FIG. 18, a "January" member 201 is attached to the rightmost side of the third row.

An example of monthly use of the noticeboard will be explained with reference to FIGS. 19 through 21.

Figure 19:
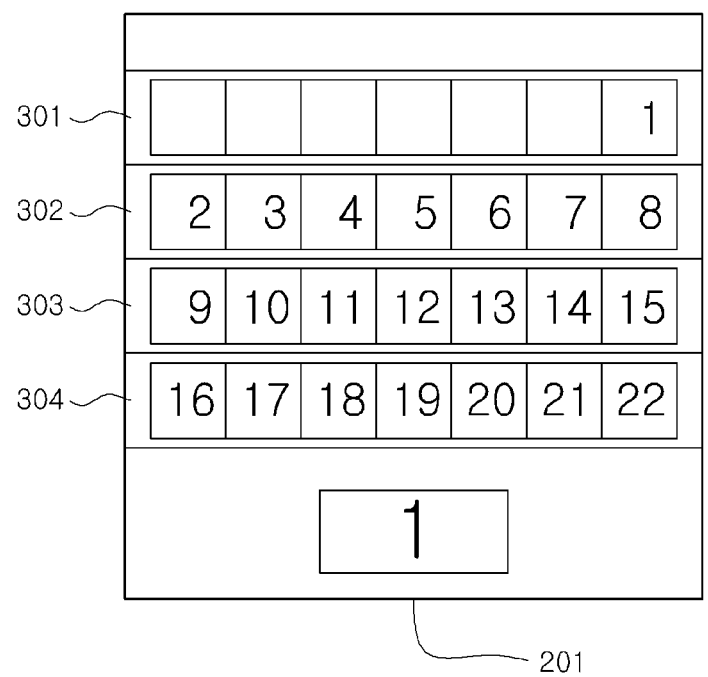
FIG. 19 is a front view showing an example of the "January" member of the noticeboard according to the present invention.

As shown in FIG. 19, at the initial stage, a "first week" member 301, a "second week" member 302, a "third week" member 303 and a "fourth week" member 304 are attached in positional order from the top to the bottom.

Figure 20:
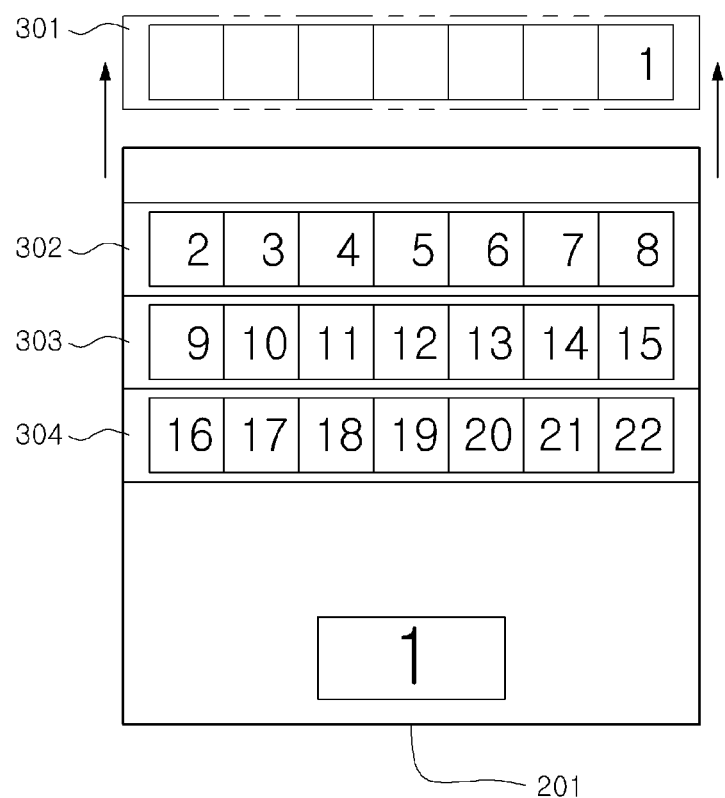
FIG. 20 is a front view illustrating a process of removing a "first week" member from a first row of the "January" member of the noticeboard and shifting the "second week" member, the "third week" member and the "fourth week" member upwards according to the present invention.

When the second week of January begins after its first week has passed, to position contents pertaining to the second week at the uppermost side, as shown in FIG. 20, the "first week" member 301 slides upwards and is separated from the month-unit member.

Thereafter, the "second week" member 302, the "third week" member 303 and the "fourth week" member 304 slide upwards so that the "second week" member 302 is positioned at the uppermost side.

Figure 21:
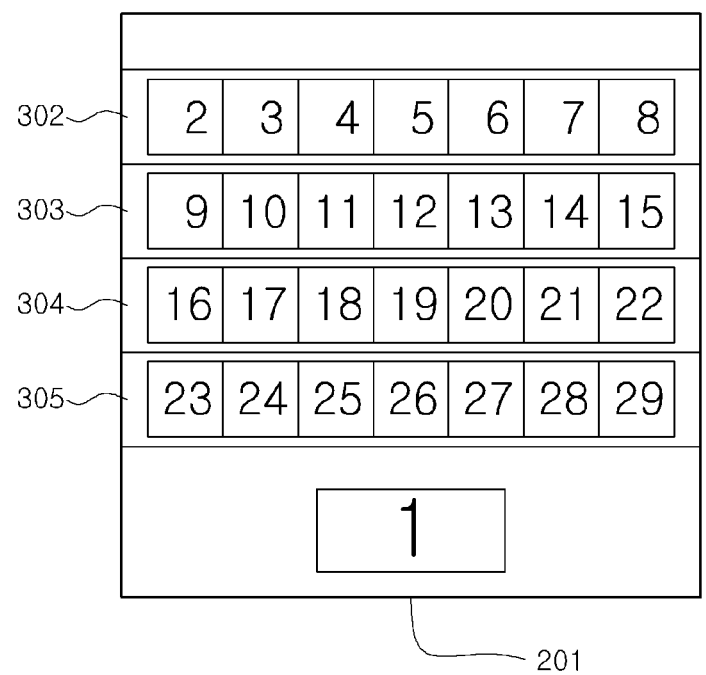
FIG. 21 is a front view showing a "fifth week" member attached to a fourth row of the "January" member of the noticeboard according to the present invention.

As shown in FIG. 21, a "fifth week" member 305 is attached to the month-unit member below the "fourth week" member 304.

Figure 22:
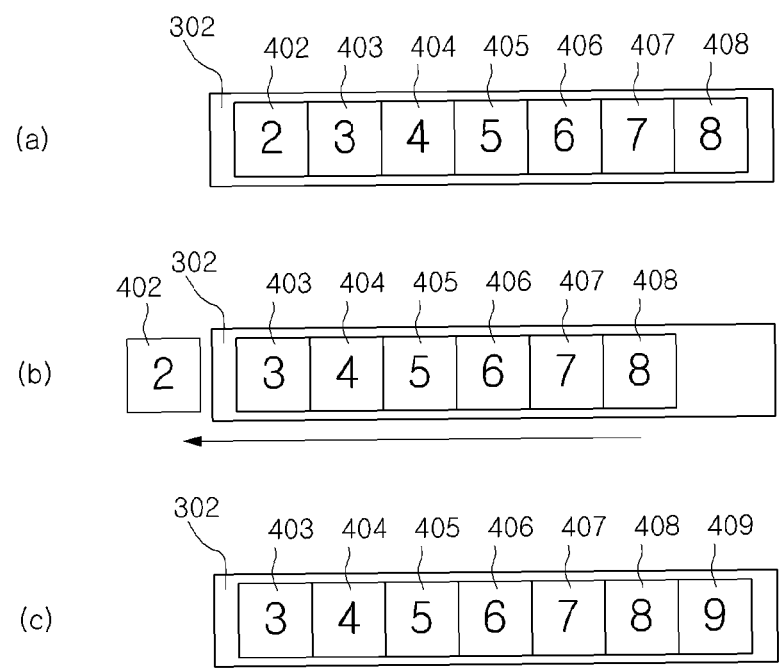
FIG. 22 is of front views showing an example of usage of a week-unit member of the noticeboard according to the present invention.

An example of weekly use of the noticeboard will be explained with reference to FIG. 22.

As shown in FIG. 22(a), for example, at the initial stage, a 2nd-day member 402, a 3rd-day member 403, a 4th-day member 404, a 5th-day member 405, a 6th-day member 406, a 7th-day member 407 and an 8th-day member 408 are attached in positional order from the left to the right.

When the 3rd day begins after the 2nd day has passed, to position contents pertaining to the 3rd day at the leftmost side, as shown in FIG. 22(b), the 2nd-day member 402 slides to the left and is separated from the week-unit member.

Subsequently, the 3rd-day member 403, the 4th-day member 404, the 5th-day member 405, the 6th-day member 406, the 7th-day member 407 and the 8th-day member 408 slide to the left so that the 3rd-day member 403 is disposed to the leftmost position.

As shown in FIG. 22(c), a 9th-day member 409 is thereafter attached to the week-unit member on the right of the 8th-day member 408.

Hereinafter, the structure of the zipper rail unit in which female zipper rails and male zipper rails are alternately arranged will be explained in detail.

Figure 23A:
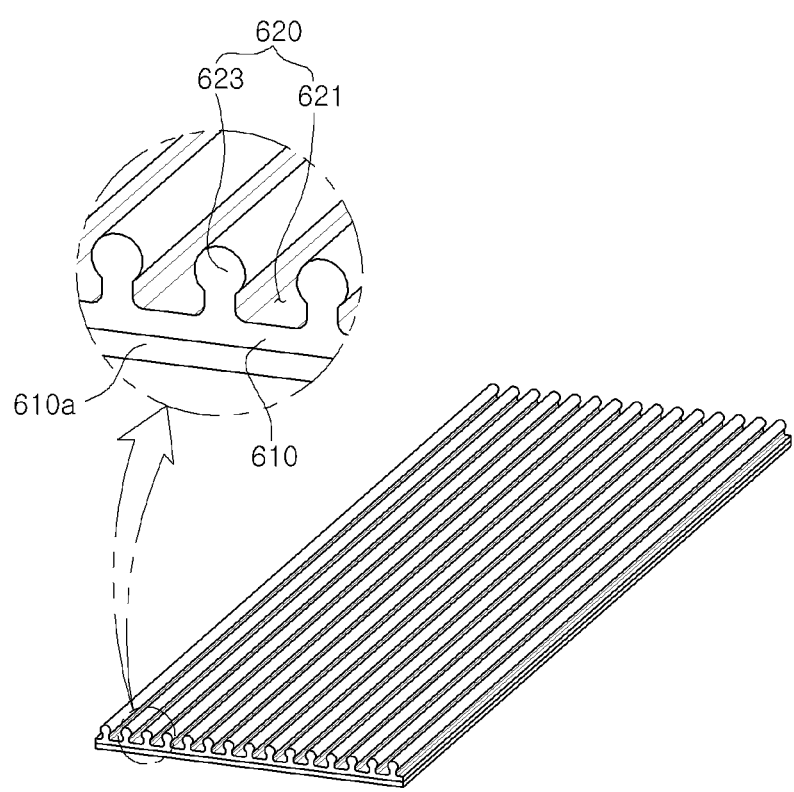
FIG. 23a is a perspective view showing a zipper rail unit provided on a zipper rail plate that has a planar shape and is attached to an object, according to an embodiment of the present invention.

As shown in FIG. 23a, in a fastening structure according to an embodiment of the present invention, a plurality of female zipper rails 621 and a plurality of male zipper rails 623 which are made of elastic material are alternately arranged on at least one surface of a zipper rail plate 610, thus forming a zipper rail unit 620.

In this embodiment, the cross-sectional area of each female zipper rail 621 is larger than that of each male zipper rail 623.

Figure 24:
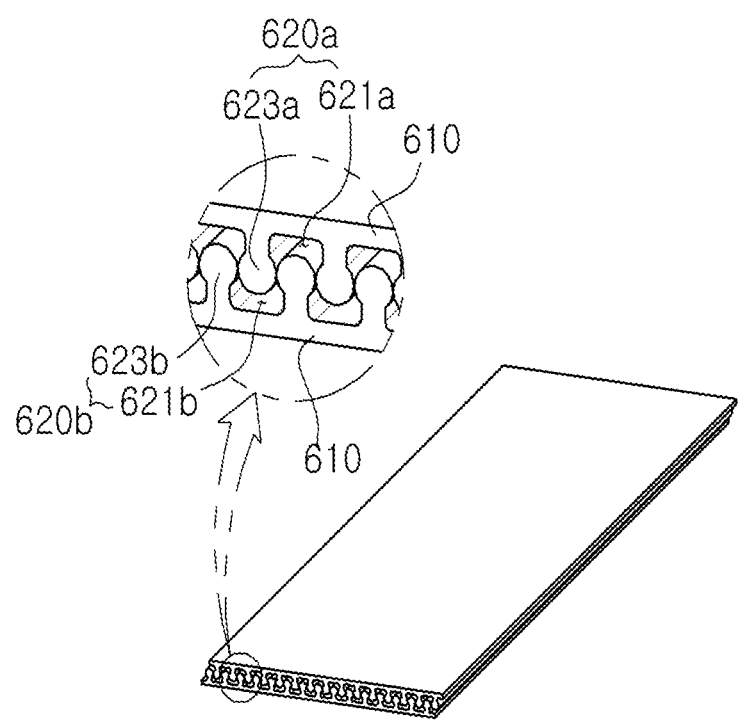
FIG. 24 is a perspective view showing a pair of zipper rail units coupled to each other, according to an embodiment of the present invention.

As shown in FIG. 24, zipper rails of a pair of zipper rail units 620*a* and 620*b* are individually coupled to each other in a female-male engagement manner.

The zipper rail plate 610 serves as a base plate on which the zipper rail unit 620 is formed. The term "base plate" means a plate that has a planar base surface. However, this does not limit the shape of the zipper rail plate 610 to the shape of a plate that has a predetermined thickness.

For instance, as shown in FIG. 23*a*, the shape of the zipper rail plate 610 is that of a plate that has a predetermined thickness, and the zipper rail unit 620 is provided on a first surface of the zipper rail plate 610. An adhesive layer 610*a* is provided on a second surface of the zipper rail plate 610 so that it can adhere to an object.

Figure 23B:
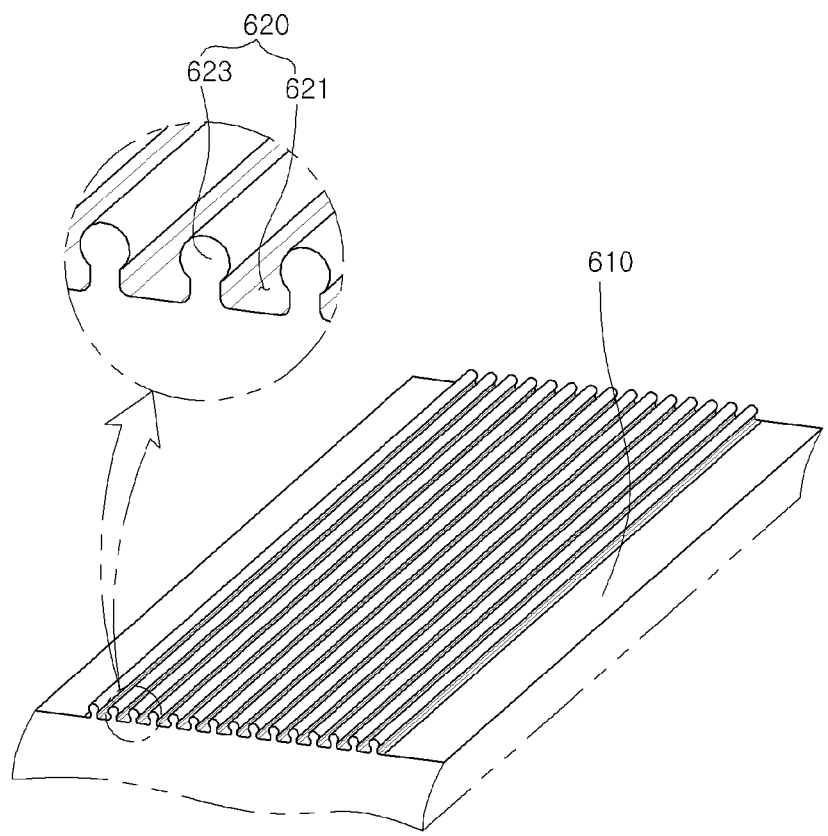
FIG. 23b is a perspective view showing a zipper rail unit that is integrally formed on an object, according to an embodiment of the present invention.

Alternatively, as shown in FIG. 23*b*, the zipper rail plate 610 may be a base surface which is formed on an approximately planar surface of an object. In this case, the zipper rail unit 620 may be integrally formed on the base surface of the object.

As shown in FIG. 24, the zipper rail unit 620*a* is provided on at least one surface of the rail plate 610 and includes female zipper rails 621*a* and male zipper rails 623*a* which are made of elastic material and are alternately arranged.

Figure 25:
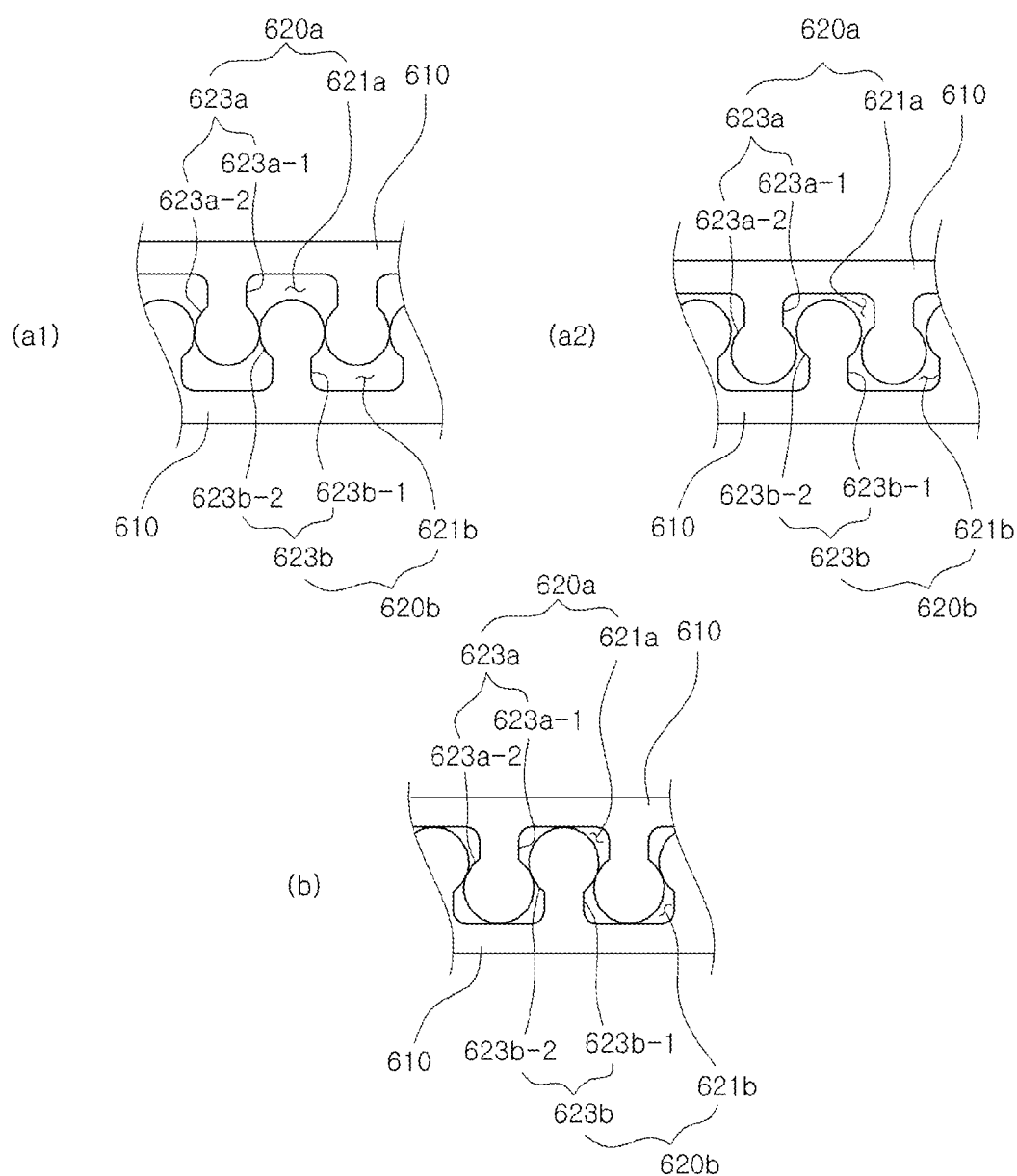
FIG. 25 is of sectional views showing a pair of zipper rail units coupled to each other in a two-point contact manner and a pair of zipper rail units coupled to each other in a three-point contact manner according to an embodiment of the present invention.

As shown in FIG. 25, each male zipper rail 623*a* includes an extension part 623*a*-1 which vertically extends from the zipper rail plate 610, and a head part 623*a*-2 which is provided on an end of the extension part 623*a*-1 and is increased in width.

Each female zipper rail 621*a* is a receiving space which is defined by the surfaces of the extension parts 623*a*-1 and the head parts 623*a*-2 of the adjacent male zipper rails 623*a* and by the surface of the zipper rail plate 610.

Here, the cross-sectional area of each female zipper rail 621*a* is larger than that of each male zipper rail 623*a*. Thereby, in the state in which the zipper rails of the zipper rail units 620*a* and 620*b* have been individually coupled to each other in the female-male engagement manner, sliding friction between the zipper rail units 620*a* and 620*b* can be reduced.

In the embodiment shown in FIG. 24, the upper zipper rail unit 620*a* which is disposed at the upper position of the drawing and the lower zipper rail unit 620*b* which is disposed below the upper zipper rail unit 620*a* are configured such that their zipper rails are individually coupled to each other in the female-male engagement manner.

In this embodiment, as shown in FIG. 25(*a*1), the upper zipper rail unit 620*a* and the lower zipper rail unit 620*b* may be coupled to each other in such a way that they form a two-point contact structure.

Alternatively, as shown in FIG. 25(*b*), the upper zipper rail unit 620*a* and the lower zipper rail unit 620*b* may be coupled to each other in such a way that they form a three-point contact structure.

In detail, as shown in FIG. 25(*a*1), the fastening structure may configured such that when the zipper rails of the zipper rail units 620*a* and 620*b* have been individually coupled to each other in the female-male engagement manner, female zipper rails 621*a* of the upper zipper rail unit 620*a* and male zipper rails 623*b* of the lower zipper rail unit 620*b* engage with each other in a two-point contact shape when seen from the sectional view.

In this case, the coupling force between the upper zipper rail unit 620*a* and the lower zipper rail unit 620*b* can be maintained, while the sliding frictional force therebetween can be minimized.

In the case where the upper zipper rail unit 620*a* and the lower zipper rail unit 620*b* are coupled to each other in the two-point contact manner, the male zipper rails 623*a* and 623*b* and the female zipper rails 621*a* and 621*b* can slide with respect to each other in the longitudinal direction of the zipper rail units 620*a* and 620*b* while they maintain the two-point contact state (refer to a1 of FIG. 25) or they are not put into contact with each other (refer to a2 of FIG. 25).

As shown in FIG. 25(*b*), the fastening structure may be configured such that when the zipper rails of the upper zipper rail unit 620*a* and the lower zipper rail unit 620*b* have been individually coupled to each other in the female-male engagement manner, the female zipper rail 621*a* of the upper zipper rail unit 620*a* and the male zipper rail 623*b* of the lower zipper rail unit 620*b* engage with each other in a three-point contact shape when seen from the sectional view.

In these cases, the sliding frictional force between the upper zipper rail unit 620*a* and the lower zipper rail unit 620*b* can be markedly reduced, compared to a typical zipper rail structure, for example, of a zipper bag, in which female and male zipper rails are put into close surface contact with each other.

In the case where the upper zipper rail unit 620*a* and the lower zipper rail unit 620*b* are coupled to each other in the three-point contact manner, the male zipper rails 623*a* and 623*b* and the female zipper rails 621*a* and 621*b* can move with respect to each other in the longitudinal direction of the zipper rail units 620*a* and 620*b* while they maintain the three-point contact state.

Generally, the zipper rail structure of the typical zipper bag is configured such that the female and male rails are put into close surface contact with each other to maximize the sealability of the zipper rail structure without taking sliding movement between the female and male rails into account.

On the contrary, in the present invention, the cross-sectional area of each female zipper rail 621*a*, 621*b* is greater than that of the corresponding male zipper rail 623*a*, 623*b*.

Therefore, the upper zipper rail unit 620*a* and the lower zipper rail unit 620*b* can be coupled to each other in the two- or three-point contact manner or without making contact with each other, thereby reducing the friction therebetween.

As a result, the present invention can provide the fastening structure suitable to sliding the zipper rails with respect to each other in the longitudinal direction of the zipper rail unit 620.

In the present invention, the zipper rail units 620*a* and 620*b* may be respectively provided on both sides of the zipper rail plate 610.

Figure 26A:
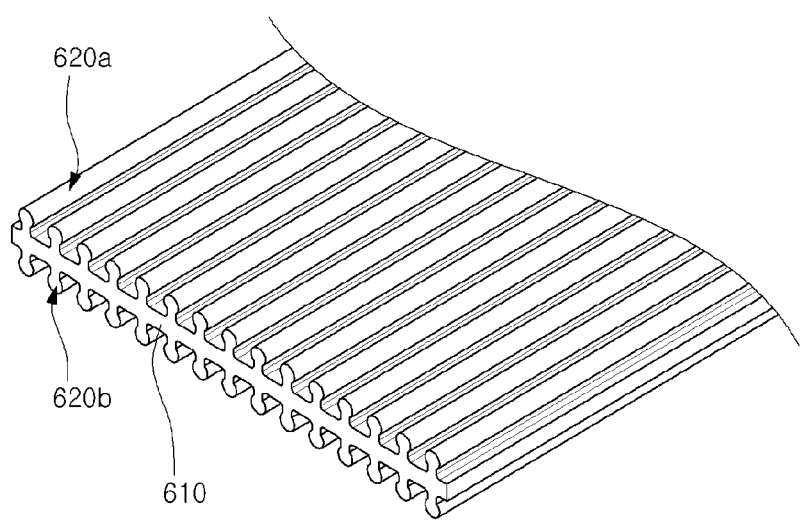
FIG. 26a is a partial perspective view illustrating zipper rail units which are provided on opposite surfaces of a zipper rail plate and oriented in the same direction, according to an embodiment of the present invention.

As shown in FIG. 26*a*, if the zipper rail units 620*a* and 620*b* disposed at the respective sides of the zipper rail plate 610 are oriented in the same direction, zipper rail units (not shown), which are respectively coupled to the zipper rail unit 620*a* disposed at a first side and to the zipper rail unit 620*b* disposed at a second side, can slide in the same direction.

Figure 26B:
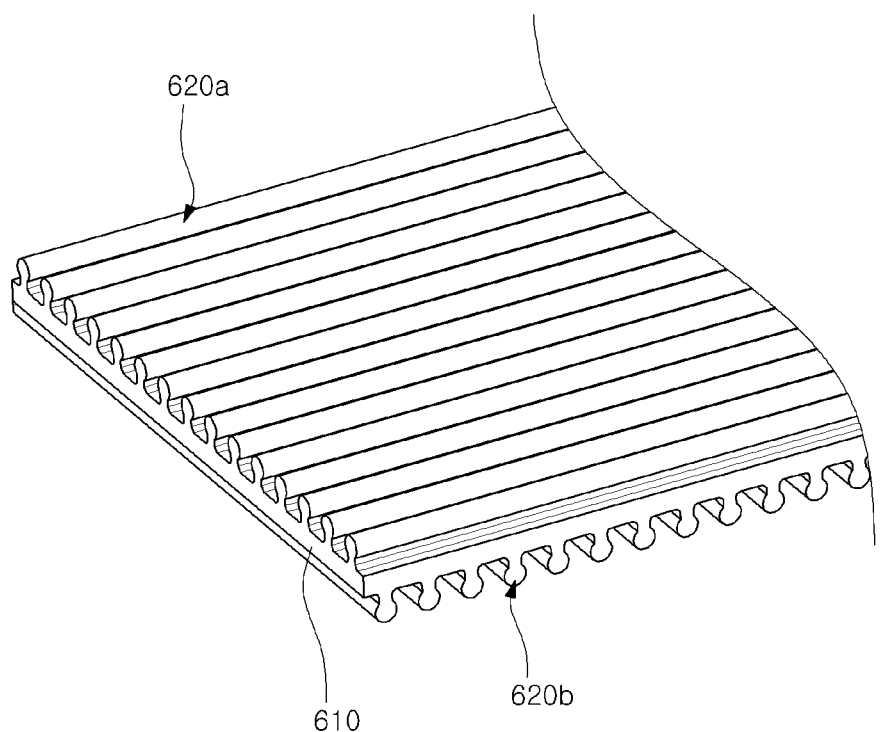
FIG. 26b is a partial perspective view illustrating zipper rail units which are provided on opposite surfaces of a zipper rail plate and oriented in directions perpendicular to each other, according to an embodiment of the present invention.

As shown in FIG. 26*b*, if the zipper rail units 620*a* and 620*b* disposed at the respective sides of the zipper rail plate 610 are inclined relative to each other at a predetermined angle, zipper rail units (not shown), which are respectively coupled to the zipper rail unit 620*a* disposed at the first side and to the zipper rail unit 620*b* disposed at the second side, can slide in directions inclined relative to each other at a predetermined angle.

Figure 27:
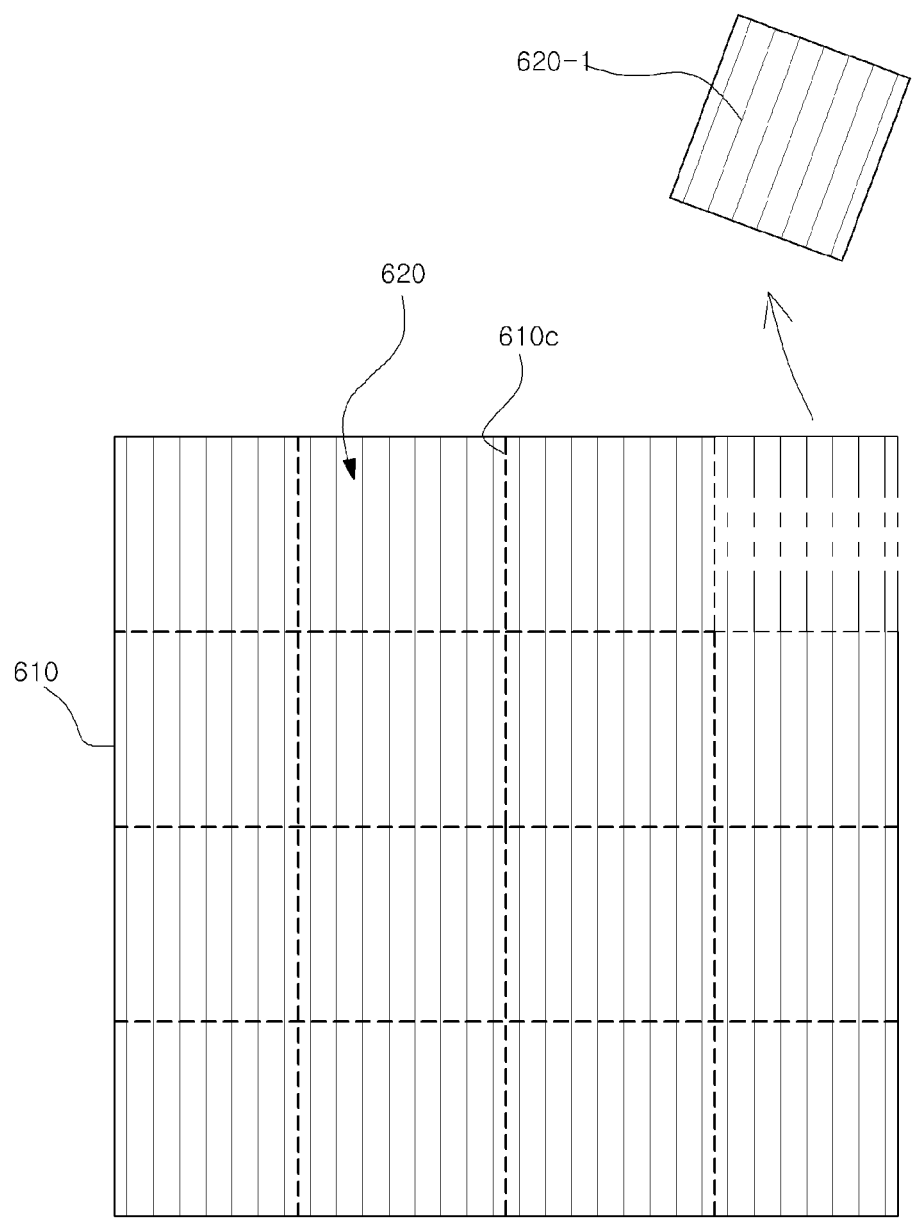
FIG. 27 is a plan view showing a zipper rail plate provided with perforated lines, according to an embodiment of the present invention.

Meanwhile, as shown in FIG. 27, if the zipper rail plate 610 has an approximately planar shape so that it can be easily attached to an object, at least one perforated line 610c may be formed in the zipper rail plate 610 to allow the zipper rail unit 620 to be divided into a plurality of smaller zipper rail units 620-1.

In this case, the size of the zipper rail plate 610 can be adjusted to a size appropriate to use as necessary by dividing it along the perforated line 610c.

In the present invention, the above-mentioned zipper rail plate 610 and zipper rail unit 620 can be formed by an extruding material such as synthetic resin. As such, if the extruding method is used to manufacture the zipper rail plate 610 and the zipper rail unit 620, the production cost can be reduced so that it is more economical.

Furthermore, a variety of synthetic resins such as polyethylene (PE), polyethyleneterephthalate (PET), polypropylene (PP), polyvinyl chloride (PVC), Ethylene Vinyl Acetate (EVA) can be used as the material of the zipper rail plate and zipper rail unit.

Hereinafter, a variety of embodiments of applications of the fastening structure of the present invention will be explained.

<Fastening Structure Used in a Cushion Mat>

Figure 28A:
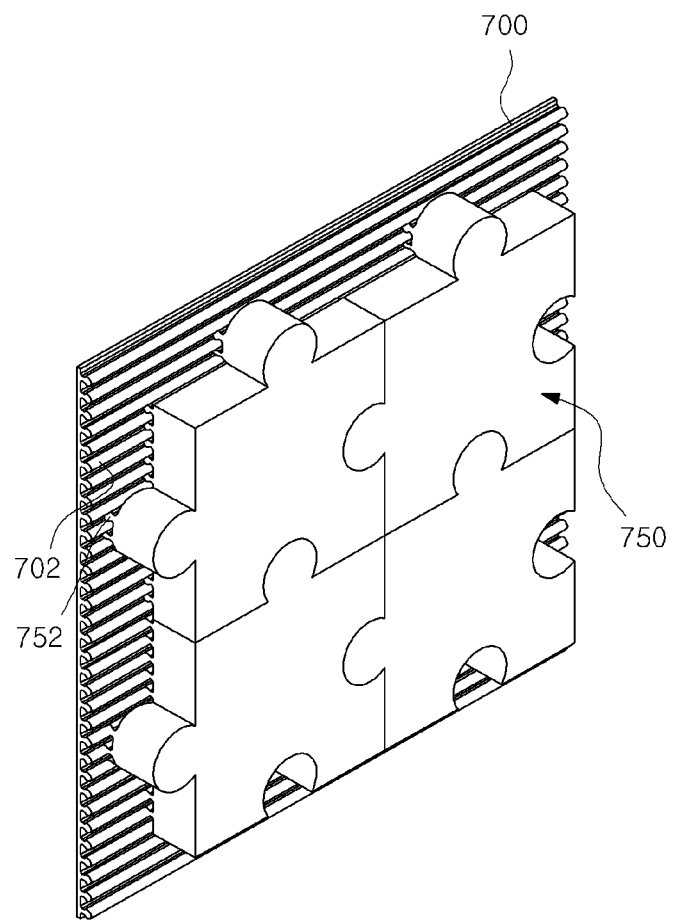
FIG. 28a is a perspective view illustrating a cushion mat in which a plurality of attachment members connected to each other are coupled to a mat plate, according to an embodiment of the present invention.
Figure 28B:
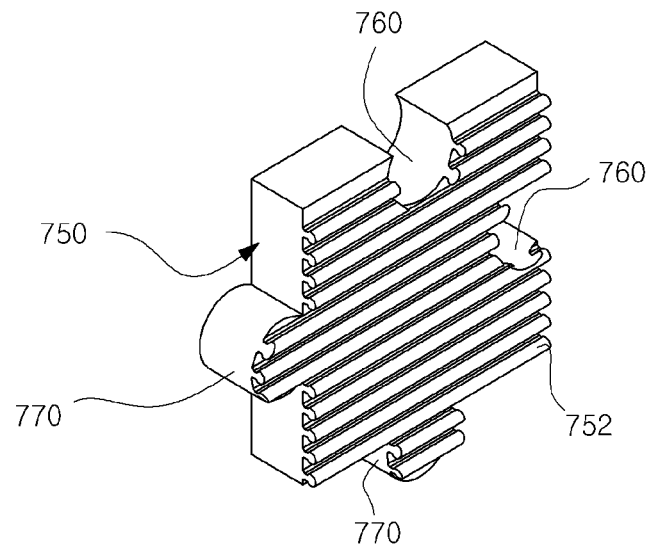
FIG. 28b is a perspective view showing an attachment member used in the cushion mat according to an embodiment of the present invention.

As shown in FIGS. 28a and 28b, the present invention can be applied to a cushion mat which includes a mat plate 700 and an attachment member 750. The mat plate 700 comprises at least one piece of mat plate and is attached to a planar support surface. A first fastening surface 702 is formed on a surface of the mat plate 700. The attachment member 750 includes a second fastening surface 752 which can be coupled to the first fastening surface 702 of the mat plate 700.

The cushion mat is an application product in which the zipper rail units are respectively provided on the first fastening surface 702 and the second fastening surface 752 so that it can be used in such a way that the zipper rails of one of the zipper rail units are individually coupled to the respective zipper rails of the other zipper rail unit in the female-male engagement manner.

As shown in FIG. 28a, the mat plate 700 has a planar shape and is attached to a planar support surface, for example, of a wall or ceiling. The first fastening surface 702 that is provided with the zipper rail unit is formed on the surface of the mat plate 700.

As shown in FIG. 28b, the shape of the attachment member 750 is that of a plate that has a predetermined thickness. The attachment member 750 includes the second fastening surface 752 which is provided with the zipper rail unit so that the second fastening surface 752 can be coupled to the first fastening surface 702 of the mat plate 700.

That is, the second fastening surface 752 of the attachment member 750 is coupled to the first fastening surface 702 formed on the surface of the mat plate 700 that is attached to the planar support surface.

Therefore, the attachment member 750 can slide in the longitudinal direction of the zipper rail unit of the first fastening surface 702 even after it has been coupled to the mat plate 700.

A typical cushion mat can be installed only on a bottom surface, but in the case of the cushion mat to which the present invention is applied, anyone can easily install it even on a wall surface or ceiling where the installation of the cushion mat has conventionally been difficult.

<Fastening Structure Applied to a Jigsaw Puzzle>

Figure 29A:
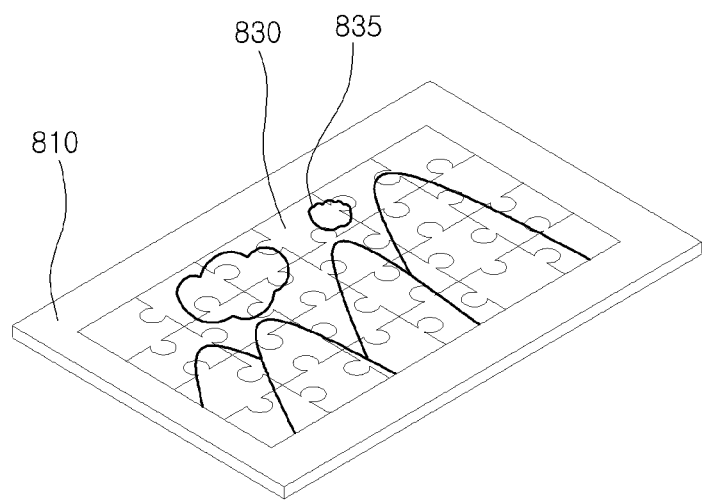
FIG. 29a is a perspective view illustrating a puzzle provided with a fastening structure according to an embodiment of the present invention.
Figure 29B:
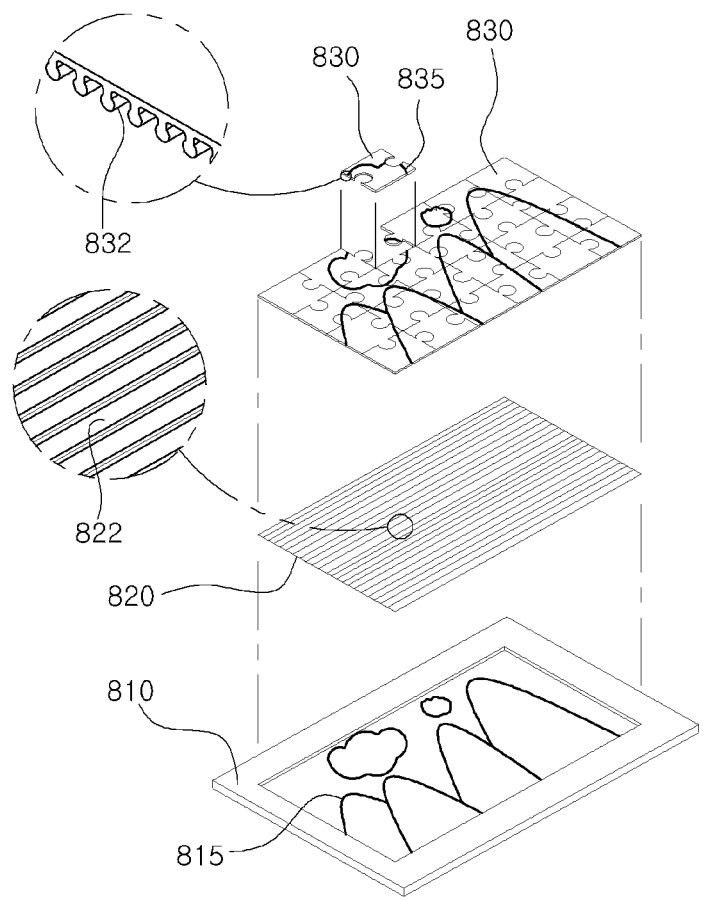
FIG. 29b is an exploded perspective view showing the puzzle provided with the fastening structure according to the present invention.

As shown in FIGS. 29a and 29b, a jigsaw puzzle to which the present invention is applied includes a base plate 810, a transparent platform 820 and a plurality of puzzle pieces 830.

A base picture 815 is drawn on an upper surface of the base plate 810. The transparent platform 820 is placed on the upper surface of the base plate 810. A first fastening surface 822 is formed on an upper surface of the transparent platform 820. Each puzzle piece 830 includes on a rear surface thereof a second fastening surface 832 which can be coupled to the first fastening surface 822 of the transparent platform 820. A piece picture 835 that corresponds to the base picture 815 is formed on each puzzle piece 830.

This jigsaw puzzle is an application product in which the zipper rail units are respectively provided on the first fastening surface 822 and the second fastening surface 832 so that it can be used in such a way that the zipper rails of the zipper rail units that correspond to each other are individually coupled to each other in the female-male engagement manner.

The base plate 810 is provided with the predetermined base picture 815 formed on the upper surface thereof.

The material of the transparent platform 820 is transparent to allow a user to see the picture 815 of the base plate 810 therethrough. The transparent platform 820 is placed on the upper surface of the base plate 810.

The first fastening surface 822 provided with the zipper rail unit is formed on the upper surface of the transparent platform 820.

The puzzle pieces 830 are separably connected to each other. The piece pictures 835 that correspond to the base picture 815 of the base plate 810 are formed on the corresponding puzzle pieces 830 so that the user can put the puzzle together.

The second fastening surface 832 provided with zipper rail unit is formed on the lower surface of each puzzle piece 830 so that the puzzle piece 830 can be coupled to the first fastening surface 822 of the transparent platform 820.

In this embodiment, although the puzzle pieces 830 have been illustrated as having protrusions and depressions by which the puzzle pieces 830 can be connected to each other, each puzzle piece 830 may have, for example, a simple rectangular shape, without having protrusions or depressions.

Therefore, the user sees the base picture 815 through the transparent platform 820 that is placed on the base plate 810 and is able to put each puzzle piece 830 at a position, at which its piece picture 835 matches the base picture 815, and fasten the second fastening surface 235 of the puzzle piece 830 to the corresponding portion of the first fastening surface 822 of the transparent platform 820.

Alternatively, the puzzle pieces 830 may be put together in such a way that after the second fastening surface 832 of each puzzle piece 830 is temporarily coupled to an appropriate portion of the first fastening surface 822 of the transparent platform 820, the puzzle piece 830 slides in the longitudinal direction of the zipper rail unit to a position at which the piece picture 835 of the puzzle piece 830 matches the base picture 815.

The jigsaw puzzle that uses the fastening structure of the present invention is advantageous in that after all the puzzle pieces 830 have been put together, the puzzle pieces 830 are prevented from being undesirably removed from the base plate 810.

<Fastening Structure Applied to a Ring Type Accessory>

Figure 30:
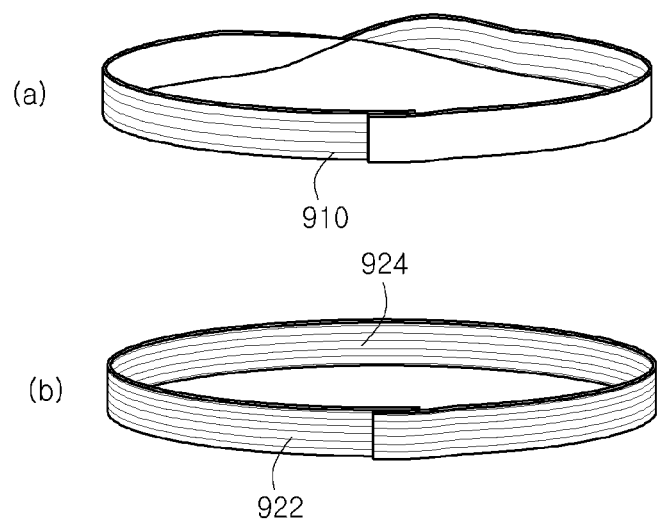
FIG. 30 is of perspective views showing a fastening structure applied to a ring type accessory, according to an embodiment of the present invention.

As shown in FIG. 30, the present invention can be applied to a ring type accessory. In detail, a fastening surface 910 is formed on at least one surface of the accessory and extends in the longitudinal direction of the accessory. A portion of the fastening surface 910 that is disposed on a first end of the accessory can be coupled to a portion of the fastening surface 910 that is disposed on a second end of the accessory so that a user can wear the accessory.

The ring type accessory is an application product in which the zipper rail unit of the present invention is provided on the fastening surface 910, and the zipper rails of the zipper rail unit that correspond to each other are individually coupled to each other in the female-male engagement manner.

As shown in FIG. 30(*a*), the ring type accessory may be configured such that the fastening surface 910 is formed only on one surface of the accessory. In this case, a portion of the fastening surface that is formed on the first end of the accessory can be coupled to a portion of the fastening surface that is formed on the second end of the accessory in such a way that the accessory is twisted in a shape of a Mobius strip.

Alternatively, as shown in FIG. 30(*b*), the ring type accessory may be configured such that fastening surfaces 922 and 924 are respectively formed on both surfaces of the accessory. In this case, a portion of the fastening surface 922 that is formed on a front surface of the first end of the accessory can be coupled to a portion of the fastening surface 924 that is formed on a rear surface of the second end of the accessory.

Furthermore, several ring type accessories of FIG. 30(*a*) or 30(*b*) may be connected to each other in series so as to further extend the length of the accessory.

Moreover, in the ring type accessory having the above-mentioned structure, an area, with which the portion of the fastening surface 910 that is formed on the first end of the accessory is coupled to the portion of the fastening surface 910 that is formed on the second end of the accessory, can be adjusted, for example, in a such way that the coupled portions slide with respect to each other in the longitudinal direction of the zipper rail unit. Thereby, the length of the ring defined by the accessory can be adjusted.

Further, a variety of patterns may be formed on the surface of the ring type accessory, thus enhancing the aesthetic effect.

In addition, if the materials used to manufacture the ring type accessory contain materials such as magnet powder, germanium, it can provide the effect of promoting the health of the user who is wearing the accessory.

<Fastening Structure Applied to a Button>

Figure 31:
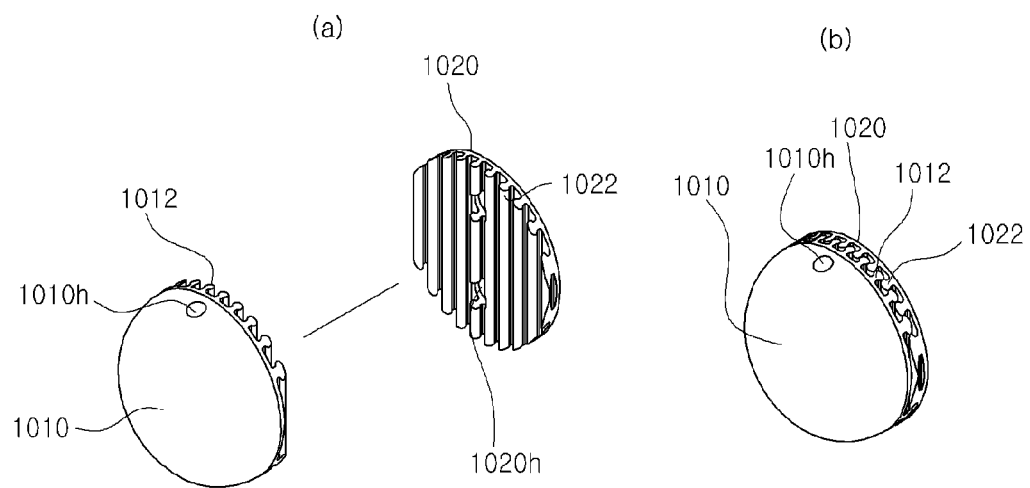
FIG. 31 is of perspective views showing a fastening structure applied to a button, according to an embodiment of the present invention.

As shown in FIG. 31, the present invention can be applied to a button which includes a base button body 1020 and a removable button body 1010. The base button body 1020 is provided with a first fastening surface 1022 formed on one surface thereof. The removable button body 1010 has on one surface thereof a second fastening surface 1012 which can be coupled to the first fastening surface 1022 of the base button body 1020.

The button is an application product in which the zipper rail units of the present invention are respectively provided on the first fastening surface 1022 and the second fastening surface 1012, and the zipper rails of the zipper rail units that correspond to each other are individually coupled to each other in the female-male engagement manner.

As shown in FIG. 31(*a*), a plurality of holes 1020*h* are formed in the base button body 1020 and used to fix the base button body 1020 to a first portion, e.g., of a cloth. A hole 1010*h* is formed in the removable button body 1010 and used to fix the removable button body 1010 to a second portion of the cloth.

The base button body 1020 and the removable button body 1010 that are fixed to the first and second sides of the cloth can be fastened to each other by coupling the surfaces of them that face each other, in other words, by coupling the first fastening surface 1022 of the base button body 102 to the second fastening surface 1012 of the removable button body 1010.

In this embodiment, the removable button body 1010 can also slide with respect to the base button body 1020 in the longitudinal direction of the zipper rail unit so that the removable button body 1010 can be removed from the base button body 1020.

Furthermore, because the first fastening surface 1022 and the second fastening surface 1012 comprise zipper rail units made of elastic material, the removable button body 1010 can also be coupled to the base button body 1020 by force-fitting it thereonto or be removed therefrom by pulling it rather than sliding it.

As another example of application, the button using the fastening structure may be used to removably fasten a cover of a product such as a diary to a main body thereof.

<Fastening Structure Applied to a Coupling Block>

Figure 32:
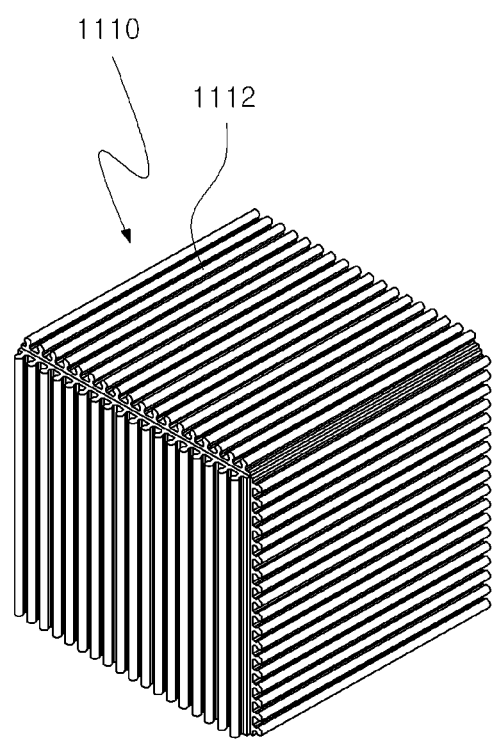
FIG. 32 is a perspective view showing a fastening structure applied to a coupling block, according to an embodiment of the present invention.

As shown in FIG. 32, the present invention can be applied to a coupling block 1110 which includes a fastening surface 1112 formed on at least one surface thereof.

The coupling block 1110 is an application product in which the zipper rail unit of the present invention is provided on the fastening surface 1112 so that it can be used in such a way that the zipper rails of the zipper rail unit of the coupling block 1110 are individually coupled to the corresponding zipper rails of the zipper rail unit of another coupling block 1110 in the female-male engagement manner.

The coupling block 1110 has a cuboidal shape. The fastening surface 1112 is provided on at least one surface of the coupling block 1110. In this embodiment, as shown in FIG. 32, the fastening surface 1112 is provided on each of all the six surfaces of the coupling block 1110.

The coupling blocks 1110, each of which has a cuboidal shape and includes the fastening surfaces 1112 that are respectively formed on all the surfaces of the block, can be coupled to each other to form a variety of structures in a manner similar to that of Lego.

Figure 33:
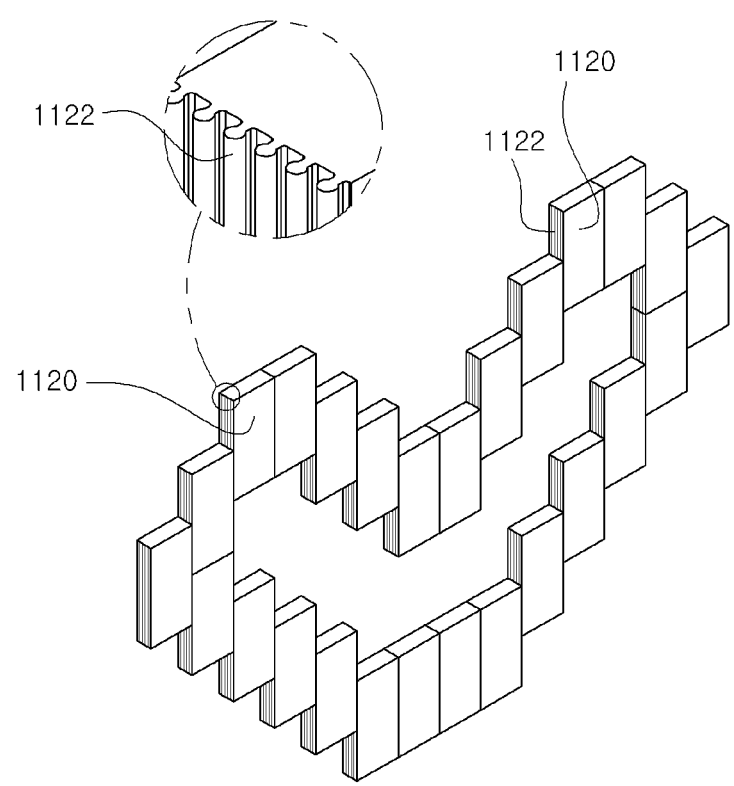
FIG. 33 is a perspective view showing a fastening structure applied to another type of coupling block, according to an embodiment of the present invention.

As shown in FIG. 33, a coupling block 1120 may have a rectangular parallelepiped shape. Fastening surfaces 1122 may be provided only on opposite side surfaces of the rectangular parallelepiped block.

In this case, as shown in FIG. 33, the opposite side surfaces of the coupling blocks 1120 are connected to each other to form, e.g. a heart-shaped structure which can be used for decoration purposes.

Furthermore, in the connection between the coupling blocks 1120, an area with which the coupling blocks 1120 overlap each other can be adjusted by sliding the coupling blocks 1120 relative to each other in the longitudinal direction of the zipper rail units.

<Fastening Structure Applied to a File Storage Container>

Figure 34:
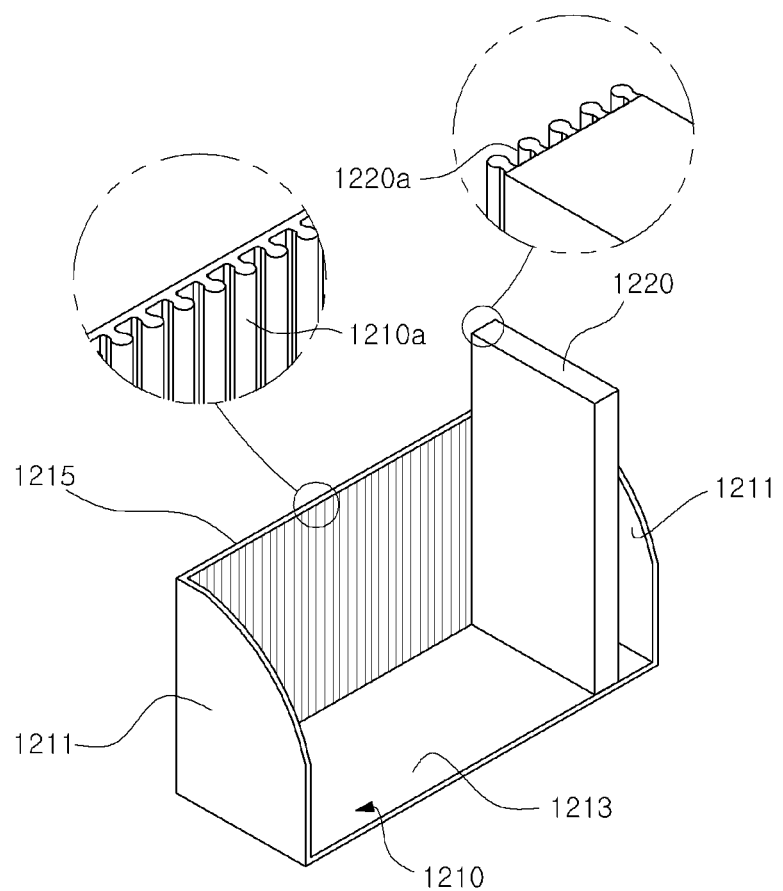
FIG. 34 is a perspective view showing a fastening structure applied to a file storage container, according to an embodiment of the present invention.

As shown in FIG. 34, the present invention can be applied to a file storage container 1210 which includes a pair of side plates 1211, a bottom plate 1213 and a rear plate 1215 such that a file 1220 can be put into the file storage container 1210.

The file storage container 1210 is an application product in which the zipper rail units of the present invention are respectively provided on the rear plate 1215 and a surface of the file 1220 that faces the rear plate 1215 so that it can be used in such a way that the zipper rails of the zipper rail units that correspond to each other are individually coupled to each other in the female-male engagement manner.

In detail, a first fastening surface 1210*a* provided with the zipper rail unit is formed on an inner surface of the rear plate 1215 of the file storage container 1210, while a second fastening surface 1220*a* provided with the zipper rail unit is formed on the corresponding surface of the file 1220 that faces the first fastening surface 1210*a*.

Thus, when the second fastening surface 1220a of the file 1220 is coupled at a predetermined position to the first fastening surface 1210a of the file storage container 1210, the file can be placed upright without falling down to the left or right despite no separate support means being used.

Furthermore, because the first and second fastening surfaces can slide in the longitudinal direction of the zipper rail units, the operation of putting the file 1220 into the file storage container 1210 to store it therein or pulling it out of the file storage container 1210 can be easily and smoothly carried out.

<Fastening Structure Applied to an Assembly Box>

Figure 35:
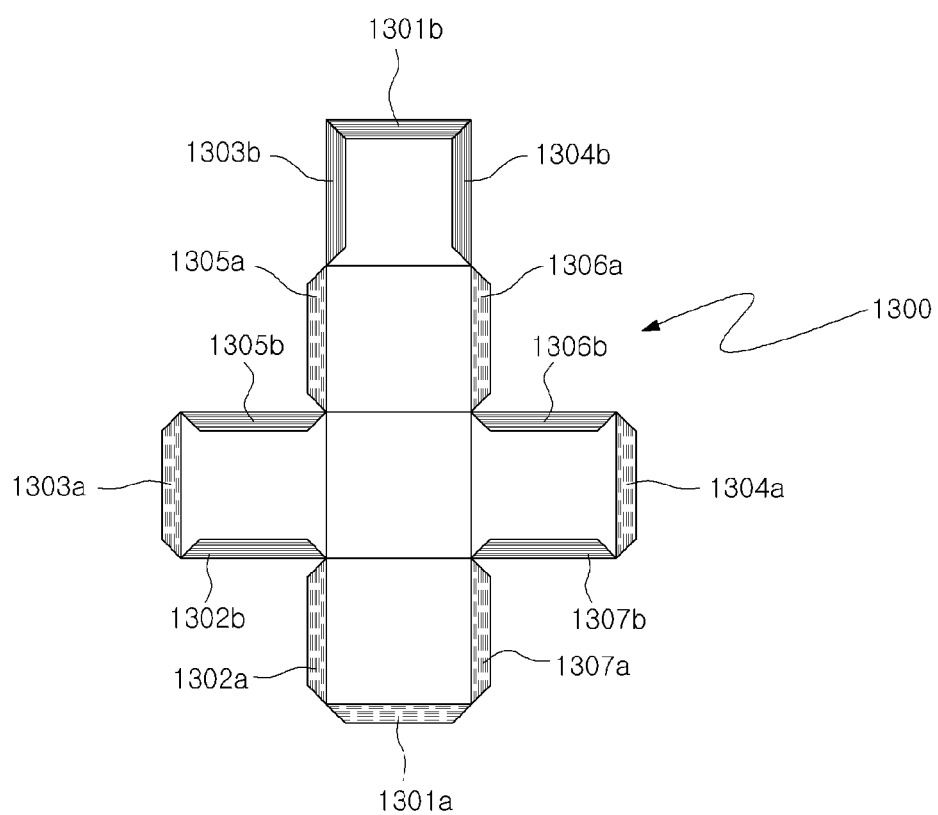
FIG. 35 is a development view showing a fastening structure applied to an assembly box, according to an embodiment of the present invention.

As shown in FIG. 35, the present invention can be applied to an assembly box which includes a plurality of base flaps 1301a, 1302a, 1303a, 1304a, 1305a, 1306a and 1307a and fastening flaps 1301b, 1302b, 1303b, 1304b, 1305b, 1306b and 1307b.

The assembly box 1300 is an application product in which the zipper rail units of the present invention are provided on corresponding surfaces of the base flaps 1301a, 1302a, 1303a, 1304a, 1305a, 1306a and 1307a and the fastening flaps 1301b, 1302b, 1303b, 1304b, 1305b, 1306b and 1307b that face each other, and the zipper rails of the zipper rail units that correspond to each other are individually coupled to each other in the female-male engagement manner.

In the case where the assembly box 1300 having the above-mentioned structure is assembled, thus forming a rectangular parallelepiped body, the first base flap 1301a is coupled to the first fastening flap 1301b.

Further, the second base flap 1302a is coupled to the second fastening flap 1302b.

In the same manner, the third base flap 1303a is coupled to the third fastening flap 1303b, . . . , and the seventh base flap 1307a is coupled to the seventh fastening flap 1307b.

As such, because each base flap 1301a, 1302a, 1303a, 1304a, 1305a, 1306a, 1307a includes the zipper rail unit and each of the fastening flaps 1301b, 1302b, 1303b, 1304b, 1305b, 1306b, 1307b also includes the zipper rail unit, the assembly box 1300 that has been used as a box can be flattened into a plane and stored. When necessary, the assembly box 1300 can be re-assembled to form the box shape.

<Fastening Structure Applied to a Card>

Figure 36:
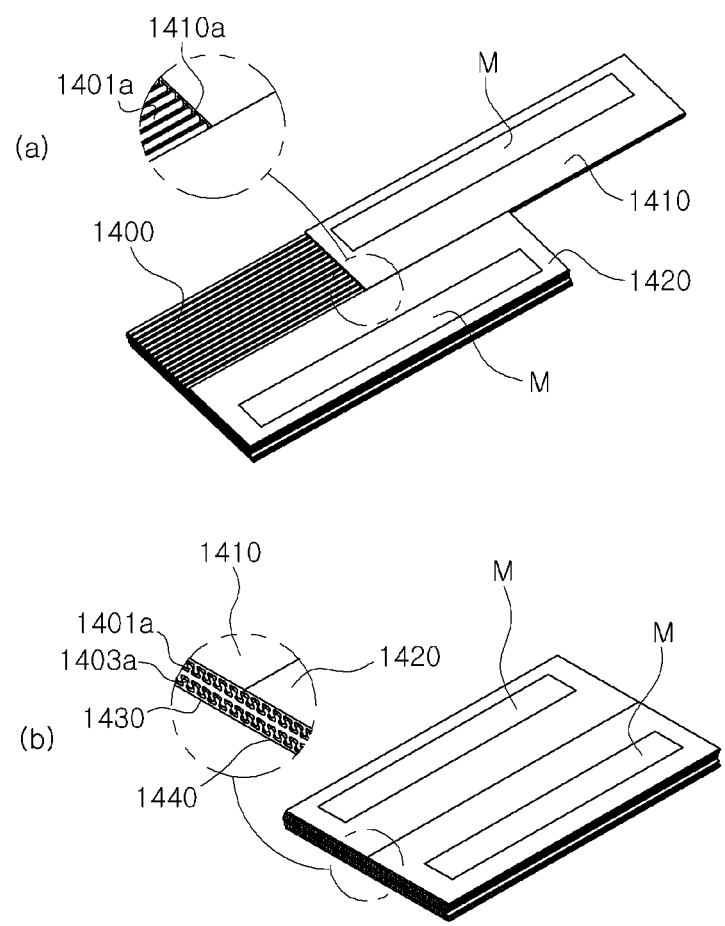
FIG. 36 is of perspective views showing a fastening structure applied to a credit card, according to an embodiment of the present invention.

As shown in FIG. 36, the present invention can be applied to a card which includes a card panel 1400 and a magnetic panel 1410. A first fastening surface 1401a is formed on a surface of the card panel 1400. A second fastening surface 1410a which can be coupled to a portion or an entirety of the first fastening surface 1401a is formed on a first surface of the magnetic panel 1410. A magnetic strip M is provided on a second surface of the magnetic panel 1410.

The card is an application product in which the zipper rail units of the present invention are respectively provided on the first fastening surface 1401a and the second fastening surface 1410a, and the zipper rails of the zipper rail units that correspond to each other are individually coupled to each other in the female-male engagement manner.

A typical card has a size of 5.5 cm×8.5 cm, and a magnetic strip that contains card information is provided on a lower end of the rear surface of the card.

Preferably, the size of the card panel 1400 is the same as that of the typical card (5.5 cm×8.5 cm). As shown in FIG. 36, first fastening surfaces 1401a and 1403a, each of which includes the zipper rail unit are respectively formed on front and rear surfaces of the card panel 1400.

In this embodiment, the size of the magnetic panel 1410 may be about half (2.75 cm×8.5 cm) of the typical card size (5.5 cm×8.5 cm).

The magnetic strip M is provided on a rear surface of the magnetic panel 1410. The second fastening surface 1410a which includes the zipper rail unit is provided on a front surface of the magnetic panel 1410 so that the magnetic panel 1410 can be coupled to a portion of the first fastening surface 1401a.

The card may be configured such that a first magnetic panel 1410 is coupled to a portion of the front surface of the card panel 1400 while a second magnetic panel 1420 is coupled to the other portion of the front surface of the card panel 1400.

Furthermore, a third magnetic panel 1430 may be coupled to a portion of the rear surface of the card panel 1400, and a fourth magnetic panel 1440 may be coupled to the other portion of the rear surface of the card panel 1400.

To allow the card to be used in a card reader, it is preferable that the thickness of the assembled card including the card panel 1400 and the magnetic panels 1410 and 1430 (the sum of the thickness of the two magnetic panels and the thickness of the card panel) be similar to that of the typical card.

In this embodiment, although the two magnetic panels 1410 and 1420 have been illustrated as being coupled to one surface of the card panel 1400, one magnetic panel or three or more magnetic panels may be provided on one surface of the card panel 1400.

When the magnetic panel 1410 is fastened to the card panel 1400, the fastening may be completed by coupling the magnetic panel 1410 to a portion of the card panel 1400 and moving it in the longitudinal direction of the zipper rail unit.

Removing the magnetic panel 1410 from the card panel 1400 can be conducted in the reverse order of the above-mentioned fastening process.

The card that uses the fastening structure of the present invention is advantageous in that several magnetic panels 1410 can be provided on the single card panel 1400 and integrally carried and used so that it is not necessary to carry several entire cards, thus increasing the portability of the cards.

<Fastening Structure Applied to an Advertisement Handle>

Figure 37:
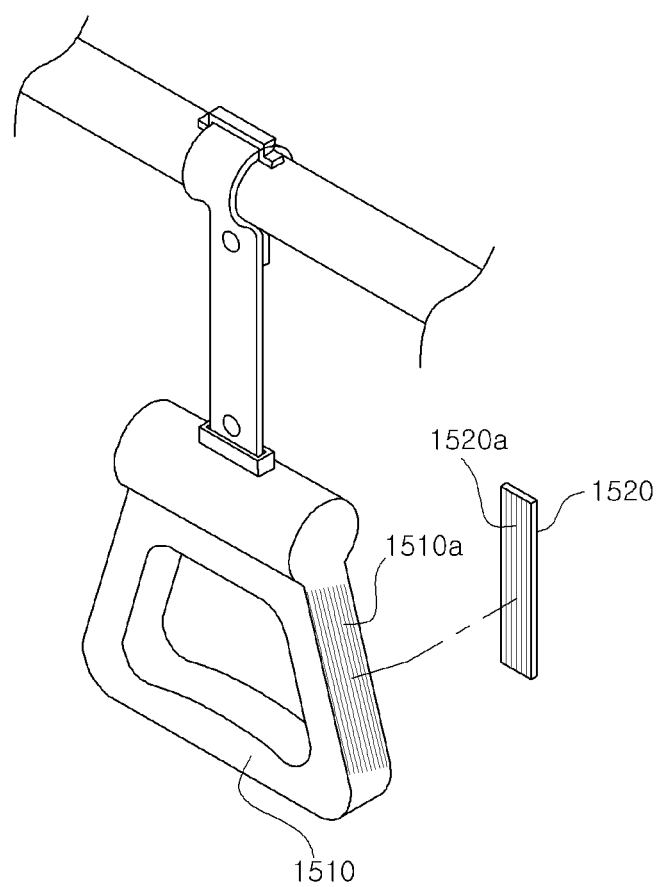
FIG. 37 is a perspective view showing a fastening structure applied to an advertisement handle, according to an embodiment of the present invention.

As shown in FIG. 37, the present invention can be applied to an advertisement handle which is installed in a passenger compartment of a public transportation vehicle and includes a handle body 1510 and an advertisement panel 1520. The handle body 1510 has a first fastening surface 1510a on one surface thereof. The advertisement panel 1520 has on one surface thereof a second fastening surface 1520a which can be coupled to the first fastening surface 1510a. An advertisement surface (not shown) is formed on the other surface of the advertisement panel 1520.

The advertisement handle is an application product in which the zipper rail units of the present invention are respectively provided on the first fastening surface 1510a and the second fastening surface 1520a, and the zipper rails of the zipper rail units that correspond to each other are individually coupled to each other in the female-male engagement manner.

The advertisement handle having the above-mentioned construction is advantageous in that the advertisement panel 1520 can be easily removably fastened to the handle body in such a way that the advertisement panel 1520 slides relative to the handle body along the longitudinal direction of the zipper rail units after the first fastening surface 1510a has been attached to the second fastening surface 1520a.

<Fastening Structure Applied to an Icon Attachment Member>

Figure 38:
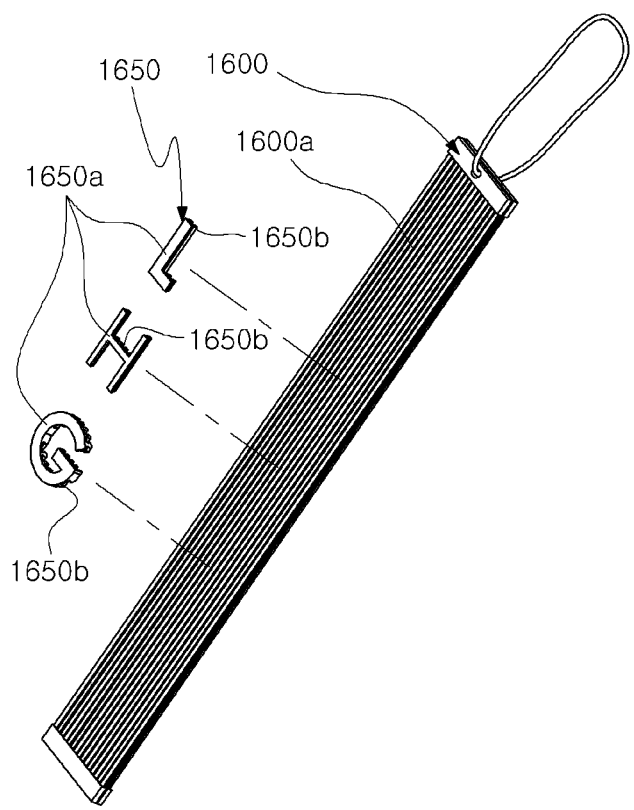
FIG. 38 is a perspective view showing a fastening structure applied to a cellular phone strap, according to an embodiment of the present invention.
Figure 39:
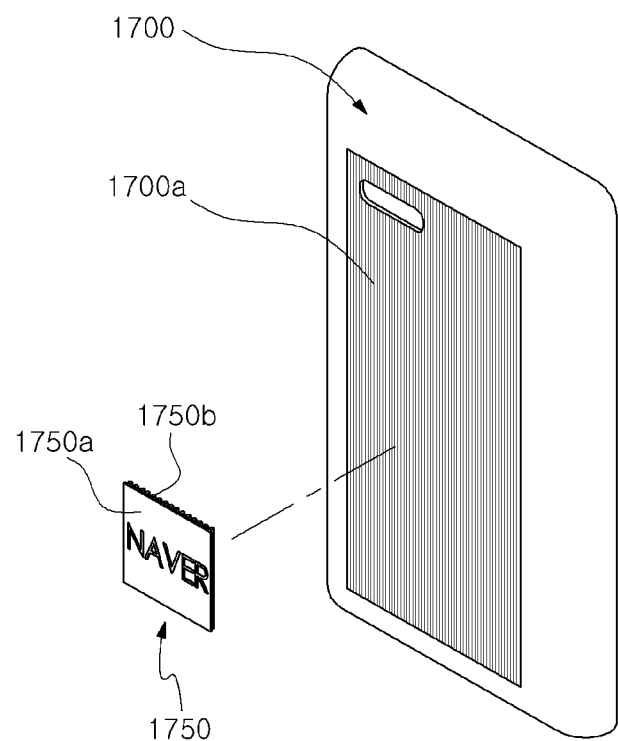
FIG. 39 is a perspective view showing a fastening structure applied to a cellular phone case, according to an embodiment of the present invention.

As shown in FIG. 38 or 39, the present invention can be applied to an icon attachment member 1650, 1750 which is removably attached to a support member 1600, 1700. A first fastening surface 1600a, 1700a is formed on one surface of the support member 1600, 1700. The icon attachment member 1650, 1750 has on one surface thereof a second fastening surface 1650b, 1750b which can be coupled to the first fastening surface 1600a, 1700a. An icon 1650a, 1750a is formed on the other surface of the icon attachment member 1650, 1750.

The icon attachment member 1650, 1750 is an application product in which the zipper rail units of the present invention are respectively provided on the first fastening surface 1600a, 1700a and the second fastening surface 1650b, 1750b, and the zipper rails of the zipper rail units that correspond to each other are individually coupled to each other in the female-male engagement manner.

The icon 1650a, 1750a can have a variety of shapes, e.g., a shape 1650a of letter of the English alphabet such as initials, or the shape 1750a of a plate on which an image is formed.

For instance, the support member may be a cellular phone strap 1600 that has at least one planar surface. The first fastening surface 1600a is formed on this planar surface. The shape of the icon 1650a may be that of initial characters such as letters of the English alphabet.

In this case, the second fastening surface 1650b of the icon attachment member 1650 can be coupled to the first fastening surface 1600a of the cellular phone strap 1600.

The icon attachment member 1650 can slide in the longitudinal direction of the zipper rail unit formed on the first fastening surface 1600a of the cellular phone strap 1600 so that the distance between the characters may be adjusted, and the positions of the characters may be changed.

The support member may be a cellular phone case 1700 which encloses the outer surface of a cellular phone.

In this case, the first fastening surface 1700a is formed on the outer surface of the cellular phone case 1700. The icon 1750a may be configured such that an image is formed on a surface of a planar member.

The second fastening surface 1750b of the icon attachment member 1750 can be removably coupled to the first fastening surface 1700a of the cellular phone case 1700.

The icon attachment member 1750 can slide in the longitudinal direction of the zipper rail unit formed on the first fastening surface 1700a of the cellular phone case 1700 so that the position of the icon attachment member 1750 on the cellular phone case 1700 can be changed.

<Fastening Structure Applied to an Educational Item>

Figure 40:
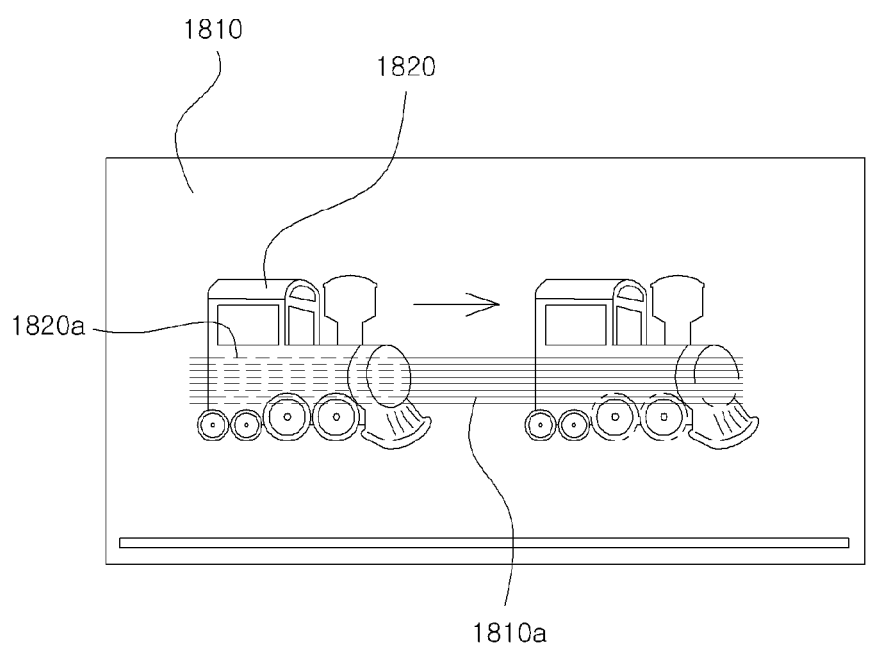
FIG. 40 is a plan view showing a fastening structure applied to an educational item, according to an embodiment of the present invention.

As shown in FIG. 40, the present invention can be applied to an educational item 1820. A first fastening surface 1810a is provided on a surface of a planar member 1810. A second fastening surface 1820a which can be coupled to the first fastening surface 1810a is formed on one surface of the educational item 1820. An educational image is formed on the outer surface of the educational item 1820.

The educational item 1820 is an application product in which the zipper rail units of the present invention are respectively provided on the first fastening surface 1810a and the second fastening surface 1820a, and the zipper rails of the zipper rail units that correspond to each other are individually coupled to each other in the female-male engagement manner.

The planar member 1810 may be an article such as a wall or a blackboard which has a planar surface of a predetermined area. The educational image may be an automobile, a train, etc.

Because the educational item 1820 can slide in the longitudinal direction of the zipper rail unit of the first fastening surface 1810a formed on the surface of the planar member 1810 after the second fastening surface 1820a of the educational item 1820 has been attached to the first fastening surface 1810a, it can facilitate teaching a student about the movement of an automobile, a train, etc.

<Fastening Structure Applied to a Flat Doll>

Figure 41:
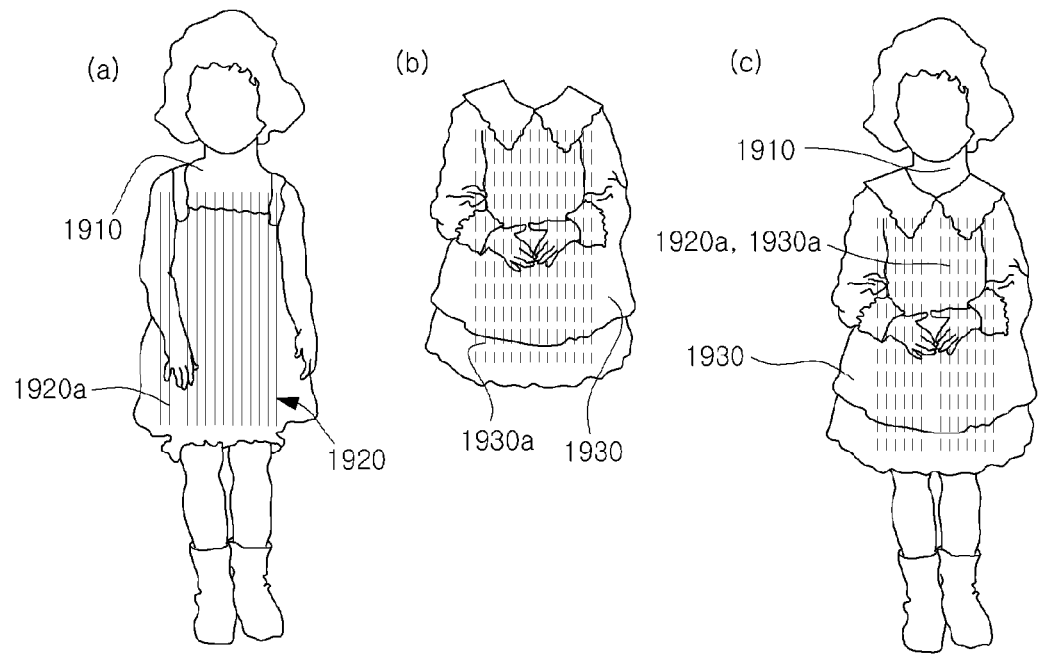
FIG. 41 is of plan views showing a fastening structure applied to a flat doll, according to an embodiment of the present invention.

As shown in FIG. 41, the present invention can be applied to a flat doll. The flat doll includes a base plate 1910, a transparent platform 1920 and a decoration plate 1930. The base plate 1910 has a predetermined shape, and a predetermined image is formed on a front surface of the base plate 1910. The transparent platform 1920 is placed on the front surface of the base plate 1910, and a first fastening surface 1920a is formed on a front surface of the transparent platform 1920. A second fastening surface 1930a which can be coupled to the first fastening surface 1920a of the transparent platform 1920 is formed on a rear surface of the decoration plate 1930. The decoration plate 1930 has an image different from the image of the base plate 1910.

The flat doll is an application product in which the zipper rail units of the present invention are respectively provided on the first fastening surface 1920a and the second fastening surface 1930a, and the zipper rails of the zipper rail units that correspond to each other are individually coupled to each other in the female-male engagement manner.

In the flat doll having the above-mentioned construction, the second fastening surface 1930a of the decoration plate 1930 can be removably coupled to the first fastening surface 1920a of the transparent platform 1920 placed on the front surface of the base plate 1910. The decoration plate 1930 can comprise a plurality of decoration plates 1930 which have different kinds of images. Therefore, the flat doll can produce the effect of providing a variety of images as well as the image formed on the front surface of the base plate 1910.

<Fastening Structure to a Storybook>

A storybook is introduced as an embodiment which uses the fastening structure of the present invention that includes the first zipper rail unit and the second zipper rail unit.

Figure 42:
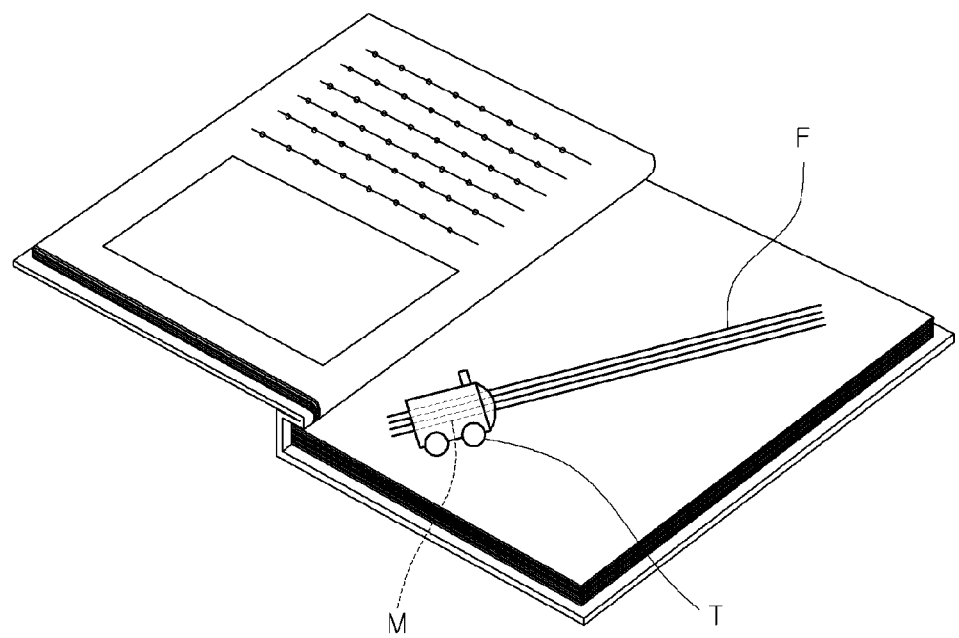
FIG. 42 is a perspective view showing a fastening structure applied to a storybook, according to an embodiment of the present invention.
Figure 43:
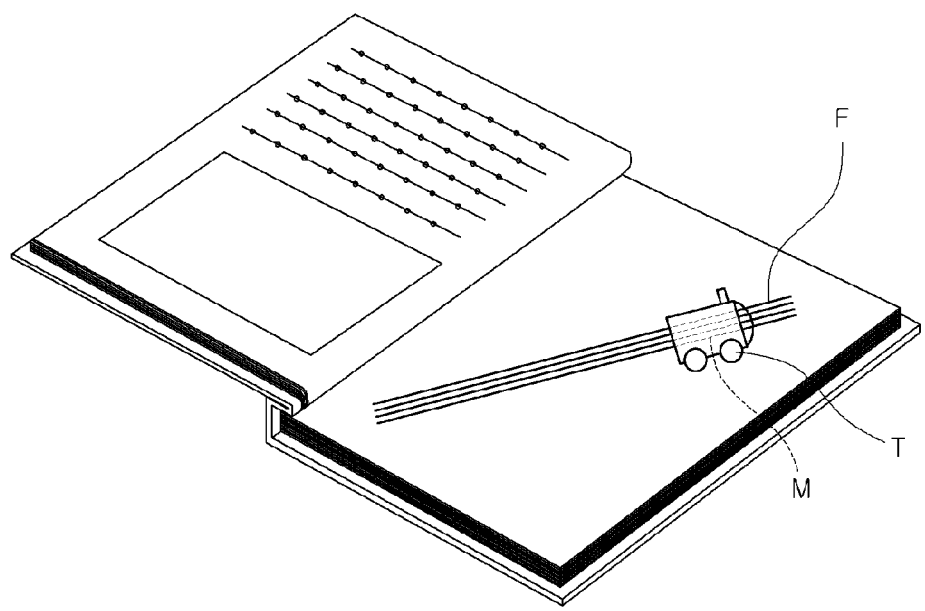
FIG. 43 is a perspective view showing a train character member shifted from one position to another position on a page of the storybook according to the present invention.

As shown in FIGS. 42 and 43, a first zipper rail unit which includes a female zipper rail F is provided on a predetermined portion of a page of the storybook.

The storybook includes a movable content T which is provided with a second zipper rail unit which includes a male zipper rail M so that the movable content T can be selectively removably coupled to the first zipper rail unit and/or be moved along it.

The movable content T may be stored separately from the storybook when it is not in use, in other words, when the corresponding page of the storybook is not open.

For instance, when a child who is reading the storybook opens a page, the movable content (T, e.g. a train character) can be used, which has been separately stored and pertains to a background and contents of the page (e.g. describing situations of a village where the train character travels).

To achieve the above purpose, the movable content that pertains to the page opened by the child who is reading the storybook is prepared. Thereafter, as shown in FIG. 42, the second zipper rail unit of the movable content is coupled to a left portion of the first zipper rail unit.

Subsequently, as shown in FIG. 43, the relative position of the movable content T can vary to the right in the longitudinal direction of the zipper rail of the first zipper rail unit against the background formed on the page of the storybook.

As such, because the relative position of the movable content T can vary along the zipper rail of the first zipper rail unit, various visual effects can be provided in response to the flow of the story.

<Fastening Structure Applied to a Pop-Up Book>

Introduced herein is a pop-up book which uses the fastening structure of the present invention that includes the first zipper rail unit and the second zipper rail unit.

Figure 44:
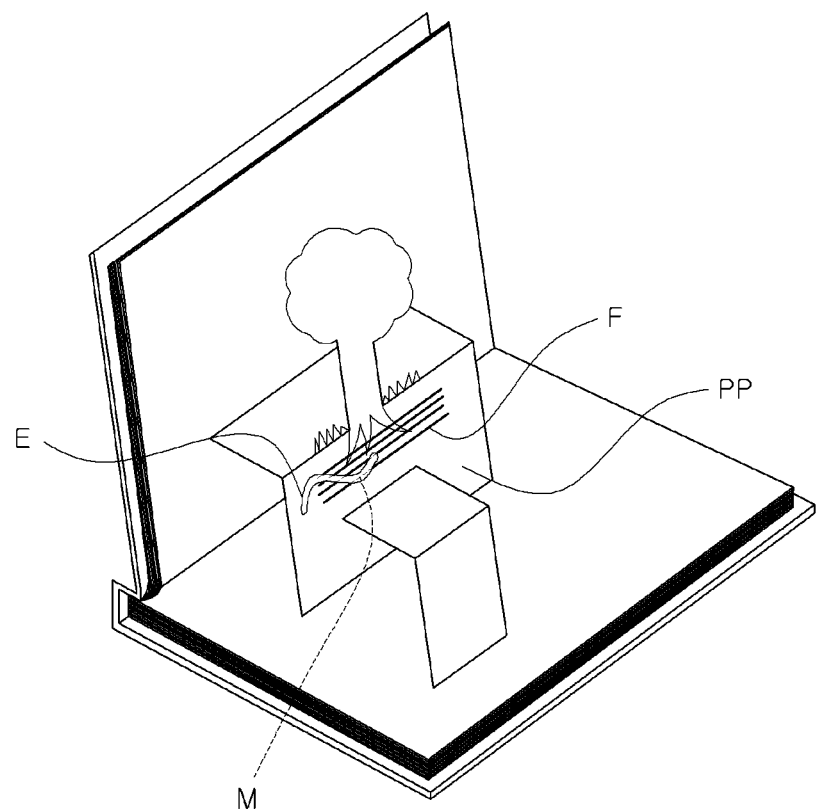
FIG. 44 is a perspective view showing a fastening structure applied to a pop-up book, according to an embodiment of the present invention.

As shown in FIG. 44, in the pop-up book which has a pop-up page, a first zipper rail unit provided with a female zipper rail F is provided on a predetermined portion of the pop-up page.

The pop-up book includes a movable content E which is provided with a second zipper rail unit which includes a male zipper rail M so that the movable content E can be selectively removably coupled to the first zipper rail unit and/or be moved along it.

The movable content E may be stored separately from the pop-up book when it is not in use, in other words, when the corresponding page of the pop-up book is not open.

For instance, when a child who is reading the pop-up book opens a pop-up page, the pop-up page is open in three dimensions. Here, the movable content (E, e.g. an earthworm character) can be used, which has been separately stored and pertains to a background and contents of the pop-up page (e.g. illustrating the ground where a tree is planted).

To achieve the above purpose, the movable content E that pertains to the pop-up page opened by the child who is reading the pop-up book is prepared. Thereafter, the second zipper rail unit of the movable content E is coupled to a left portion of the first zipper rail unit.

Subsequently, the relative position of the movable content E can vary to the right in the longitudinal direction of the zipper rail of the first zipper rail unit against the background formed on the pop-up page of the pop-up book. As a result, as the relative position of the movable content E varies, various visual effects can be provided.

<Fastening Structure Applied to a Menu Table>

Introduced herein is a menu table which uses the fastening structure of the present invention and includes the first zipper rail unit and the second zipper rail unit.

The menu table includes a base plate 2000, item members 2001, 2003 and 2005 and price members 2002, 2004 and 2006.

A first zipper rail unit is provided on a front surface of the base plate 2000 and oriented sideways.

A second zipper rail unit which is oriented sideways is provided on a rear surface of each of the item members 2001, 2003 and 2005 and price members 2002, 2004 and 2006.

Figure 45:
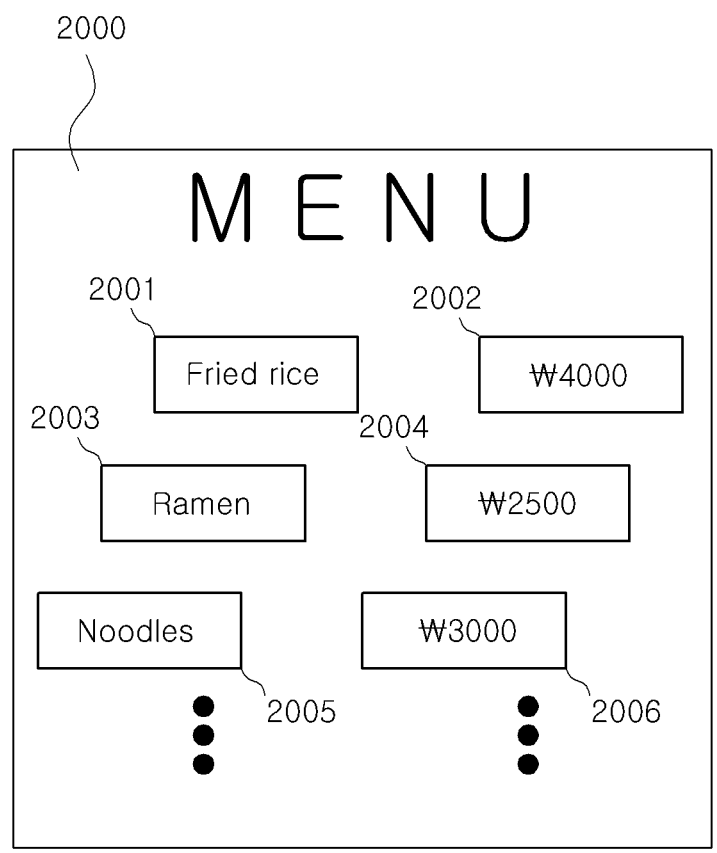
FIG. 45 is a front view showing a fastening structure applied to a menu table, according to an embodiment of the present invention.
Figure 46:
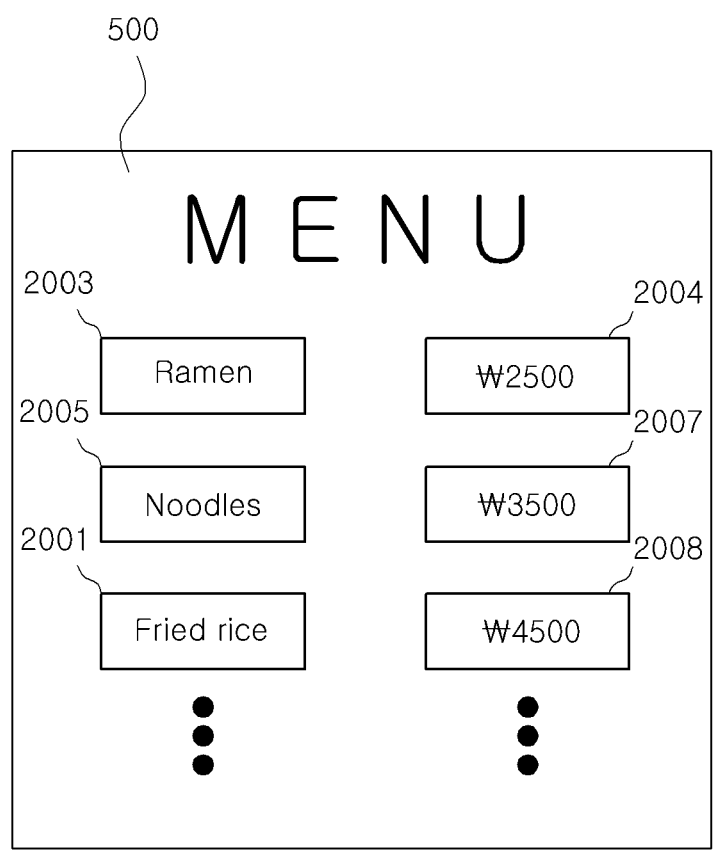
FIG. 46 is a front view showing shift or replacement of item members and price members of the menu table according to the present invention.

As shown in FIGS. 45 and 46, the menu table having the above-mentioned construction is advantageous in that when it is required to change the locations of the item members 2001, 2003 and 2005 and the price members 2002, 2004 and 2006 or to adjust the price of an item, they/it can be easily attached to the base plate or removed therefrom or easily moved on the base plate.

Although the preferred embodiments of the present invention have been disclosed for illustrative purposes, those skilled in the art will appreciate that various modifications, additions and substitutions are possible, without departing from the scope and spirit of the invention. Accordingly, the bounds of the present invention must be interpreted by the accompanying claims which can include all the modifications, additions and substitutions.

The invention claimed is:

1. A fastening structure for fastening a plurality of objects to each other, the objects respectively having planar portions and facing each other, the fastening structure comprising:

a first zipper rail unit provided on a planar portion of a first object, the first zipper rail unit comprising a plurality of zipper rails made of elastic material and arranged parallel to each other; and a second zipper rail unit provided on a planar portion of a second object, the second zipper rail unit comprising a plurality of zipper rails made of elastic material and arranged parallel to each other, wherein while the zipper rails of the first zipper rail unit are individually coupled to the corresponding zipper rails of the second zipper rail unit in a female-male engagement manner, relative positions between the first object and the second object are able to be changed with respect to a longitudinal direction of the zipper rails, wherein the first object is coupled to the second object by force-fitting or is removed therefrom by pulling wherein each of the zipper rail units comprises a plurality of female zipper rails and male zipper rails made of elastic material and alternately arranged on at least one surface of a zipper rail plate, wherein a cross-sectional area of each of the female zipper rails is larger than a cross-sectional area of each of the male zipper rails, and the zipper rails of the pair of zipper rail units that correspond to each other are individually coupled to each other in the female-male engagement manner;

wherein each of the male zipper rails comprises: an extension part perpendicularly extending from the zipper rail plate; and a ball-shaped head part provided on an end of the extension part, the head part having an increased width, and each of the female zipper rails comprises a receiving space defined both by surfaces of the extension parts and head parts of the adjacent male zipper rails and by a surface of the zipper rail plate in such a way that each of the ball-shaped head part engages with each of the female zipper rails by directly touching the surface of the zipper rail plate;

wherein while the zipper rails of the pair of zipper rail units that correspond to each other are individually coupled to each other in the female-male engagement manner, each of the female zipper rails of one of the pair of zipper rail units and the corresponding male zipper rail of a remaining one of the pair of zipper rail units are coupled to each other in such a way as to form at least two-point contact structure when seen in a sectional view;

and wherein the zipper rail plate has a planar shape so that the zipper rail plate can be attached to either one of the objects, and at least one perforated line is formed in the zipper rail plate so that each zipper rail unit can be divided into a plurality of smaller zipper rail units.

2. The fastening structure according to claim 1, wherein while the zipper rails of the pair of zipper rail units that correspond to each other are individually coupled to each other in the female-male engagement manner, each of the female zipper rails of one of the pair of zipper rail units and the corresponding male zipper rail of a remaining one of the pair of zipper rail units are coupled to each other in such a way as to form a three-point contact structure when seen in a sectional view.

3. The fastening structure according to claim 1, wherein each zipper rail unit is provided on each of both sides of the zipper rail plate so that objects are fastened to each other to form a multi-layered structure, wherein the zipper rail units provided on the respective sides of the zipper rail plate are oriented in a same direction.

4. The fastening structure according to claim 1, wherein each zipper rail unit is provided on each of both sides of the zipper rail plate so that objects are fastened to each other to form a multi-layered structure, wherein the zipper rail units provided on the respective sides of the zipper rail plate are oriented such that the zipper rail units are inclined relative to each other at a predetermined angle.

5. The fastening structure according to claim 1, wherein the zipper rail plate and each zipper rail unit are integrally formed by extruding.

6. The fastening structure according to claim 1, wherein the zipper rail plate and each zipper rail unit are made of synthetic resin.

7. The fastening structure according to claim 1, wherein each zipper rail unit is provided on a first surface of the zipper rail plate, and an adhesive layer is formed on a second surface of the zipper rail plate.

8. The fastening structure according to claim 1, wherein the first object comprises a mat plate comprising at least one piece of mat plate, the mat plate being attached to a planar support surface and having a first fastening surface provided with each zipper rail unit, and the second object comprises an attachment member having a second fastening surface provided with each zipper rail unit so that the second fastening surface can be coupled to the first fastening surface of the mat plate.

9. The fastening structure according to claim 1, wherein the first object comprises a base body having a first fastening surface provided with the zipper rail unit, and the second object comprises a removable body having a second fastening surface provided with the zipper rail unit so that the second fastening surface can be coupled to the first fastening surface of the base body.

10. The fastening structure according to claim 1, further comprising: a planar medial object interposed between the first object and the second object, the planar medial object having: a third zipper rail unit provided on one planar portion of the planar medial object and comprising a plurality of zipper rails made of elastic material and arranged parallel to each other; and a fourth zipper rail unit provided on an opposite planar portion of the planar medial object and comprising another plurality of zipper rails made of elastic material and arranged parallel to each other, wherein the first object comprises a top-level post surface of a noticeboard, the medial object comprises a medial-level post surface that is smaller than the first object, and the second object comprises a bottom-level post surface that is smaller than the medial object, and the top-level post surface, the medial-level post surface and the bottom-level post surface can be selectively attached to each other or removed from each other and/or successively moved and rearranged.

11. A fastening structure for fastening a plurality of objects to each other, the objects respectively having planar portions and facing each other, the fastening structure comprising:
    a first zipper rail unit provided on a planar portion of a first object, the first zipper rail unit comprising a plurality of zipper rails made of elastic material and arranged parallel to each other; and
    a second zipper rail unit provided on a planar portion of a second object, the second zipper rail unit comprising a plurality of zipper rails made of elastic material and arranged parallel to each other,
    wherein while the zipper rails of the first zipper rail unit are individually coupled to the corresponding zipper rails of the second zipper rail unit in a female-male engagement manner, relative positions between the first object and the second object are able to be changed with respect to a longitudinal direction of the zipper rails, wherein the first object is coupled to the second object by force-fitting or is removed therefrom by pulling wherein each of the zipper rail units comprises a plurality of female zipper rails and male zipper rails made of elastic material and alternately arranged on at least one surface of a zipper rail plate, wherein a cross-sectional area of each of the female zipper rails is larger than a cross-sectional area of each of the male zipper rails, and the zipper rails of the pair of zipper rail units that correspond to each other are individually coupled to each other in the female-male engagement manner;
    wherein each of the male zipper rails comprises: an extension part perpendicularly extending from the zipper rail plate; and a ball-shaped head part provided on an end of the extension part, the head part having an increased width, and each of the female zipper rails comprises a receiving space defined both by surfaces of the extension parts and head parts of the adjacent male zipper rails and by a surface of the zipper rail plate in such a way that each of the ball-shaped head part engages with each of the female zipper rails by directly touching the surface of the zipper rail plate;
    wherein while the zipper rails of the pair of zipper rail units that correspond to each other are individually coupled to each other in the female-male engagement manner, each of the female zipper rails of one of the pair of zipper rail units and the corresponding male zipper rail of a remaining one of the pair of zipper rail units are coupled to each other in such a way as to form at least two-point contact structure when seen in a sectional view;
    and wherein a base plate is provided with a base picture formed on an upper surface thereof, wherein the first object comprises a transparent platform placed on the upper surface of the base plate, the transparent platform having on a front surface thereof a first fastening surface provided with each zipper rail unit, and the second object comprises a plurality of puzzle pieces, each of which has on a rear surface thereof a second fastening surface provided with each zipper rail unit so that the second fastening surface can be coupled to the first fastening surface of the transparent platform, with a piece of a picture formed on a front surface of each of the puzzle pieces, the piece of the picture corresponding to the base picture.

12. A fastening structure for fastening a plurality of objects to each other, the objects respectively having planar portions and facing each other, the fastening structure comprising:
    a first zipper rail unit provided on a planar portion of a first object, the first zipper rail unit comprising a plurality of zipper rails made of elastic material and arranged parallel to each other; and
    a second zipper rail unit provided on a planar portion of a second object, the second zipper rail unit comprising a plurality of zipper rails made of elastic material and arranged parallel to each other,
    wherein while the zipper rails of the first zipper rail unit are individually coupled to the corresponding zipper rails of the second zipper rail unit in a female-male engagement manner, relative positions between the first object and the second object are able to be changed with respect to a longitudinal direction of the zipper rails, wherein the first object is coupled to the second object by force-fitting or is removed therefrom by pulling;
    wherein each of the zipper rail units comprises a plurality of female zipper rails and male zipper rails made of elastic material and alternately arranged on at least one surface of a zipper rail plate, wherein a cross-sectional area of each of the female zipper rails is larger than a cross-sectional area of each of the male zipper rails, and the zipper rails of the pair of zipper rail units that correspond to each other are individually coupled to each other in the female-male engagement manner;

wherein each of the male zipper rails comprises: an extension part perpendicularly extending from the zipper rail plate; and a ball-shaped head part provided on an end of the extension part, the head part having an increased width, and each of the female zipper rails comprises a receiving space defined both by surfaces of the extension parts and head parts of the adjacent male zipper rails and by a surface of the zipper rail plate in such a way that each of the ball-shaped head part engages with each of the female zipper rails by directly touching the surface of the zipper rail plate;

wherein while the zipper rails of the pair of zipper rail units that correspond to each other are individually coupled to each other in the female-male engagement manner, each of the female zipper rails of one of the pair of zipper rail units and the corresponding male zipper rail of a remaining one of the pair of zipper rail units are coupled to each other in such a way as to form at least two-point contact structure when seen in a sectional view; and wherein the first object comprises an object having, on one surface thereof, a first fastening surface provided with each zipper rail unit, and the second object comprises an icon attachment member removably coupled to the first fastening surface, the icon attachment member having, on a first surface thereof, a second fastening surface provided with each zipper rail unit so that the second fastening surface can be coupled to the first fastening surface, with an icon provided on a second surface of the icon attachment member.

13. A fastening structure for fastening a plurality of objects to each other, the objects respectively having planar portions and facing each other, the fastening structure comprising:

a first zipper rail unit provided on a planar portion of a first object, the first zipper rail unit comprising a plurality of zipper rails made of elastic material and arranged parallel to each other; and a second zipper rail unit provided on a planar portion of a second object, the second zipper rail unit comprising a plurality of zipper rails made of elastic material and arranged parallel to each other, wherein while the zipper rails of the first zipper rail unit are individually coupled to the corresponding zipper rails of the second zipper rail unit in a female-male engagement manner, relative positions between the first object and the second object are able to be changed with respect to a longitudinal direction of the zipper rails, wherein the first object is coupled to the second object by force-fitting or is removed therefrom by pulling;

wherein each of the zipper rail units comprises a plurality of female zipper rails and male zipper rails made of elastic material and alternately arranged on at least one surface of a zipper rail plate, wherein a cross-sectional area of each of the female zipper rails is larger than a cross-sectional area of each of the male zipper rails, and the zipper rails of the pair of zipper rail units that correspond to each other are individually coupled to each other in the female-male engagement manner;

wherein each of the male zipper rails comprises: an extension part perpendicularly extending from the zipper rail plate; and a ball-shaped head part provided on an end of the extension part, the head part having an increased width, and each of the female zipper rails comprises a receiving space defined both by surfaces of the extension parts and head parts of the adjacent male zipper rails and by a surface of the zipper rail plate in such a way that each of the ball-shaped head part engages with each of the female zipper rails by directly touching the surface of the zipper rail plate;

wherein while the zipper rails of the pair of zipper rail units that correspond to each other are individually coupled to each other in the female-male engagement manner, each of the female zipper rails of one of the pair of zipper rail units and the corresponding male zipper rail of a remaining one of the pair of zipper rail units are coupled to each other in such a way as to form at least two-point contact structure when seen in a sectional view;

wherein the first object comprises an object having, on one surface thereof, a first fastening surface provided with each zipper rail unit, and the second object comprises an icon attachment member removably coupled to the first fastening surface, the icon attachment member having, on a first surface thereof, a second fastening surface provided with each zipper rail unit so that the second fastening surface can be coupled to the first fastening surface, with an icon provided on a second surface of the icon attachment member; and wherein the first object comprises a cellular phone case enclosing an outer surface of a cellular phone, wherein the first fastening surface is provided on an outer surface of the cellular phone case.

14. A fastening structure for fastening a plurality of objects to each other, the objects respectively having planar portions and facing each other, the fastening structure comprising:

a first zipper rail unit provided on a planar portion of a first object, the first zipper rail unit comprising a plurality of zipper rails made of elastic material and arranged parallel to each other; and a second zipper rail unit provided on a planar portion of a second object, the second zipper rail unit comprising a plurality of zipper rails made of elastic material and arranged parallel to each other, wherein while the zipper rails of the first zipper rail unit are individually coupled to the corresponding zipper rails of the second zipper rail unit in a female-male engagement manner, relative positions between the first object and the second object are able to be changed with respect to a longitudinal direction of the zipper rails, wherein the first object is coupled to the second object by force-fitting or is removed therefrom by pulling;

wherein each of the zipper rail units comprises a plurality of female zipper rails and male zipper rails made of elastic material and alternately arranged on at least one surface of a zipper rail plate, wherein a cross-sectional area of each of the female zipper rails is larger than a cross-sectional area of each of the male zipper rails, and the zipper rails of the pair of zipper rail units that correspond to each other are individually coupled to each other in the female-male engagement manner;

wherein each of the male zipper rails comprises: an extension part perpendicularly extending from the zipper rail plate; and a ball-shaped head part provided on an end of the extension part, the head part having an increased width, and each of the female zipper rails comprises a receiving space defined both by surfaces of the extension parts and head parts of the adjacent male zipper rails and by a surface of the zipper rail plate in such a way that each of the ball-shaped head part engages with each of the female zipper rails by directly touching the surface of the zipper rail plate;

wherein while the zipper rails of the pair of zipper rail units that correspond to each other are individually coupled to each other in the female-male engagement manner, each of the female zipper rails of one of the pair of zipper rail units and the corresponding male zipper rail of a remaining one of the pair of zipper rail units are coupled to each other in such a way as to form at least two-point contact structure when seen in a sectional view; and wherein the first object comprises a planar object having a first fastening surface provided with each zipper rail unit, and the second object comprises an educational item having, on a first surface thereof, a second fastening surface provided with each zipper rail unit so that the second fastening surface can be coupled to the first fastening surface, with an educational image formed on a second surface of the educational item.

15. A fastening structure for fastening a plurality of objects to each other, the objects respectively having planar portions and facing each other, the fastening structure comprising:
   a first zipper rail unit provided on a planar portion of a first object, the first zipper rail unit comprising a plurality of zipper rails made of elastic material and arranged parallel to each other; and
   a second zipper rail unit provided on a planar portion of a second object, the second zipper rail unit comprising a plurality of zipper rails made of elastic material and arranged parallel to each other,
   wherein while the zipper rails of the first zipper rail unit are individually coupled to the corresponding zipper rails of the second zipper rail unit in a female-male engagement manner, relative positions between the first object and the second object are able to be changed with respect to a longitudinal direction of the zipper rails, wherein the first object is coupled to the second object by force-fitting or is removed therefrom by pulling;
   wherein each of the zipper rail units comprises a plurality of female zipper rails and male zipper rails made of elastic material and alternately arranged on at least one surface of a zipper rail plate, wherein a cross-sectional area of each of the female zipper rails is larger than a cross-sectional area of each of the male zipper rails, and the zipper rails of the pair of zipper rail units that correspond to each other are individually coupled to each other in the female-male engagement manner;
   wherein each of the male zipper rails comprises: an extension part perpendicularly extending from the zipper rail plate; and a ball-shaped head part provided on an end of the extension part, the head part having an increased width, and each of the female zipper rails comprises a receiving space defined both by surfaces of the extension parts and head parts of the adjacent male zipper rails and by a surface of the zipper rail plate in such a way that each of the ball-shaped head part engages with each of the female zipper rails by directly touching the surface of the zipper rail plate;
   wherein while the zipper rails of the pair of zipper rail units that correspond to each other are individually coupled to each other in the female-male engagement manner, each of the female zipper rails of one of the pair of zipper rail units and the corresponding male zipper rail of a remaining one of the pair of zipper rail units are coupled to each other in such a way as to form at least two-point contact structure when seen in a sectional view; and
   and wherein a base plate having a predetermined shape is provided, with an image formed on a front surface of the base plate, wherein the first object comprises a transparent platform placed on the front surface of the base plate, the transparent platform having on a front surface thereof a first fastening surface provided with each zipper rail unit, and the second object comprises a decoration plate having, on a rear surface thereof, a second fastening surface provided with each zipper rail unit so that the second fastening surface can be coupled to the first fastening surface of the transparent platform, the decoration plate having, on a front surface thereof, an image different from the image formed on the base plate.

16. A fastening structure for fastening a plurality of objects to each other, the objects respectively having planar portions and facing each other, the fastening structure comprising:
   a first zipper rail unit provided on a planar portion of a first object, the first zipper rail unit comprising a plurality of zipper rails made of elastic material and arranged parallel to each other; and
   a second zipper rail unit provided on a planar portion of a second object, the second zipper rail unit comprising a plurality of zipper rails made of elastic material and arranged parallel to each other,
   wherein while the zipper rails of the first zipper rail unit are individually coupled to the corresponding zipper rails of the second zipper rail unit in a female-male engagement manner, relative positions between the first object and the second object are able to be changed with respect to a longitudinal direction of the zipper rails, wherein the first object is coupled to the second object by force-fitting or is removed therefrom by pulling;
   wherein each of the zipper rail units comprises a plurality of female zipper rails and male zipper rails made of elastic material and alternately arranged on at least one surface of a zipper rail plate, wherein a cross-sectional area of each of the female zipper rails is larger than a cross-sectional area of each of the male zipper rails, and the zipper rails of the pair of zipper rail units that correspond to each other are individually coupled to each other in the female-male engagement manner;
   wherein each of the male zipper rails comprises: an extension part perpendicularly extending from the zipper rail plate; and a ball-shaped head part provided on an end of the extension part, the head part having an increased width, and each of the female zipper rails comprises a receiving space defined both by surfaces of the extension parts and head parts of the adjacent male zipper rails and by a surface of the zipper rail plate in such a way that each of the ball-shaped head part engages with each of the female zipper rails by directly touching the surface of the zipper rail plate;
   wherein while the zipper rails of the pair of zipper rail units that correspond to each other are individually coupled to each other in the female-male engagement manner, each of the female zipper rails of one of the pair of zipper rail units and the corresponding male zipper rail of a remaining one of the pair of zipper rail units are coupled to each other in such a way as to form at least two-point contact structure when seen in a sectional view; and wherein the planar portion of the first object comprises an inner page of a book, and the second object comprises a content element changing a position thereof relative to a background formed on the inner page, thus varying a visual effect.

* * * * *